US010154256B1

(12) United States Patent
Segapelli et al.

(10) Patent No.: US 10,154,256 B1
(45) Date of Patent: Dec. 11, 2018

(54) FLASH COLOR CALIBRATION

(71) Applicant: QUALCOMM Incorporated, San Diego, CA (US)

(72) Inventors: Loic Francois Segapelli, San Diego, CA (US); Hengzhou Ding, San Diego, CA (US); Leung Chun Chan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 15/621,963

(22) Filed: Jun. 13, 2017

(51) Int. Cl.
H04N 5/222 (2006.01)
H04N 5/225 (2006.01)
H04N 17/00 (2006.01)
G06T 7/90 (2017.01)
G06K 9/62 (2006.01)

(52) U.S. Cl.
CPC ......... H04N 17/002 (2013.01); G06K 9/6202 (2013.01); G06K 9/6215 (2013.01); G06T 7/90 (2017.01); H04N 5/2256 (2013.01)

(58) Field of Classification Search
CPC .. H04N 5/2354; H04N 5/2352; H04N 1/6086; G03B 15/04; G03B 15/05; G03B 7/16; G03B 15/02
See application file for complete search history.

(56) References Cited

U.S. PATENT DOCUMENTS 9,110,355 B1 * 8/2015 Nourbakhsh .......... G03B 15/05
9,766,533 B2 * 9/2017 Park ....................... G03B 15/05
9,819,874 B2 * 11/2017 Chien ................... H04N 5/2258
2003/0025822 A1 * 2/2003 Shimada ................ H04N 9/735
  348/370
2006/0067668 A1 * 3/2006 Kita ........................ G03B 15/05
  396/182
2008/0094484 A1 * 4/2008 Wu ......................... H04N 9/735
  348/223.1
2009/0136224 A1 * 5/2009 Aoyagi .................. G03B 15/05
  396/157

(Continued)

FOREIGN PATENT DOCUMENTS

JP 2004347757 A 12/2004

OTHER PUBLICATIONS

International Search Report and Written Opinion—PCT/US2018/028950—ISA/EPO—dated Jul. 31, 2018.

Primary Examiner — Chia Wei A Chen
(74) Attorney, Agent, or Firm — Paradice and Li LLP/Qualcomm

(57) ABSTRACT

Aspects of the present disclosure relate to systems and methods for calibrating a flash for image capture. An example method may include receiving, from a camera, a first image of a scene captured with a first flash light source emitting light with a first color temperature and with a second flash light source emitting light with a second color temperature different from the first color temperature. The first flash light source and the second flash light source may be derived based on a first flash calibration setting of a number of stored flash calibration settings. The example method may also include determining a difference between a desired color characteristic for the first flash calibration setting and a color characteristic of the first image. The example method may further include adjusting the first flash calibration setting based on the determined difference.

30 Claims, 17 Drawing Sheets

(56) References Cited

U.S. PATENT DOCUMENTS

| | | | |
|---|---|---|---|
| 2010/0189429 A1* | 7/2010 | Butterworth | G03B 7/08 396/155 |
| 2010/0254692 A1* | 10/2010 | Kurt | G03B 15/03 396/155 |
| 2012/0057044 A1 | 3/2012 | Shimizu | |
| 2013/0016249 A1* | 1/2013 | Mine | H04N 5/2351 348/223.1 |
| 2014/0340573 A1* | 11/2014 | Clawson | H04N 5/2256 348/371 |
| 2015/0116534 A1* | 4/2015 | Kim | H04N 1/6027 348/223.1 |
| 2015/0229820 A1* | 8/2015 | Chu | H04N 5/2256 348/224.1 |
| 2015/0304620 A1* | 10/2015 | Guyomarc'h | H04N 9/735 348/224.1 |
| 2016/0088278 A1* | 3/2016 | Velarde | H04N 9/735 348/371 |
| 2016/0183344 A1* | 6/2016 | Chitta | G05B 19/102 315/294 |
| 2016/0191881 A1 | 6/2016 | Sako et al. | |
| 2016/0337565 A1* | 11/2016 | Long | G03B 15/05 |
| 2017/0162130 A1* | 6/2017 | Ghoshal | G09G 5/026 |

* cited by examiner

FLASH COLOR CALIBRATION

TECHNICAL FIELD

This disclosure relates generally to flash systems for image capture devices, and specifically to calibrating a flash system.

BACKGROUND OF RELATED ART

Many devices and systems (such as smartphones, tablets, digital cameras, security systems, computers, and so on) include cameras for various applications. Each camera requires a minimum brightness or luminance in a scene in order to capture the scene. For example, a camera might not accurately capture colors and details of a scene with low light settings (such as indoors, at night, and so on). To compensate for low ambient light, cameras use a flash in order to increase the brightness of the scene.

Many devices use a xenon flash tube or a light emitting diode (LED) for flash photography. Each flash tube or LED is typically associated with a color temperature, and the flash tube or LED light at the color temperature may cause a color cast or other undesirable color characteristics in an image. Although an undesirable color cast may be removed by post-processing the image, image post-processing may cause areas of an image with greater ambient light to have a warm color cast or other undesirable color characteristics.

To prevent undesirable color characteristics in captured images, some devices include two or more light sources (such as multiple flash tubes or multiple LEDs) with different color temperatures to adjust the total color temperature for a flash, for example, to reduce mismatches between the flash color and the scene's illuminant color. However, because flash tubes or LEDs of a same type may have minor variations in color temperature, flash systems with multiple flash tubes or LEDs typically require calibration. LEDs require during manufacture, for example, to compensate for variations in color temperature between the LEDs.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to calibrating a flash system for image capture. In some implementations, the flash system may be calibrated by adjusting one or more stored flash calibration settings. In one example, a method for adjusting a first flash calibration setting stored on a device is disclosed. The method may include receiving, from a camera, a first image of a scene captured with a first flash light source emitting light having a first color temperature and with a second flash light source emitting light at a second color temperature different from the first color temperature. In some aspects, the first flash light source and the second flash light source are driven based on a first flash calibration setting of a number of stored flash calibration settings. The method may also include determining a difference between a desired color characteristic for the first flash calibration setting and a color characteristic of the first image, and adjusting the first flash calibration setting based on the determined difference.

In another example, a device including a flash system is disclosed. The device includes a camera, a first flash light source configured to emit light having a first color temperature, and a second flash light source configured to emit light having a second color temperature different from the first color temperature. The device also includes a memory including a number of stored flash calibration settings, wherein each flash calibration setting is associated with a different color characteristic. The device further includes a processor configured to receive, from the camera, a first image of a scene captured with the first flash light source and the second flash light source driven based on a first flash calibration setting of the number of stored flash calibration settings. The processor is also configured to determine a difference between a desired color characteristic for the first flash calibration setting and a color characteristic of the first image; and adjust the first flash calibration setting based on the determined difference.

In another example, a non-transitory computer-readable medium is disclosed. The non-transitory computer-readable medium may store instructions that, when executed by the one or more processors, cause the device to perform operations including receiving, by a camera, a first image of a scene with a first flash light source emitting light with a first color temperature and with a second flash light source emitting light having a second color temperature different from the first color temperature, wherein the first flash light source and the second flash light source are driven based on a first flash calibration setting of a number of stored flash calibration settings. Execution of the instructions by the one or more processors also may cause the device to determine a difference between a desired color characteristic for the first flash calibration setting and a color characteristic of the first image. Execution of the instructions by the one or more processors also may cause the device to adjust the first flash calibration setting based on the determined difference.

In another example, a device including a flash system is disclosed. The device includes means for receiving, from a camera, a first image of a scene with a first flash light source emitting light having a first color temperature and with a second flash light source emitting light having a second color temperature different from the first color temperature, wherein the first flash light source and the second flash light source are driven based on a first flash calibration setting of a number of stored flash calibration settings. The device also includes means for determining a difference between a desired color characteristic for the first flash calibration setting and a color characteristic of the first image. The device also includes means for adjusting the first flash calibration setting based on the determined difference.

BRIEF DESCRIPTION OF THE DRAWINGS

Aspects of this disclosure are illustrated by way of example, and not by way of limitation, in the figures of the accompanying drawings and in which like reference numerals refer to similar elements.

DETAILED DESCRIPTION

Figure 1A:
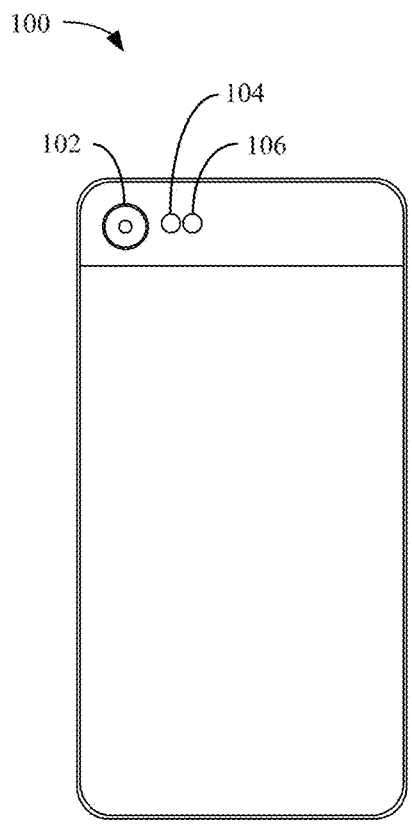
FIG. 1A depicts an example device including a camera and multiple flash light sources.

Aspects of the present disclosure may allow a device to calibrate its flash system for capturing images, and may be applicable to devices having a variety of camera and flash light source configurations that allow a blended output color provided by the flash light sources to be substantially homogenous. In some implementations, the device may capture an image of a scene using a flash system including first and second light sources (such as LEDs or flash tubes). The first flash light source may have a first color temperature at a first intensity level (such as a first current for a first LED), and the second flash light source may have a second color temperature at a second intensity level (such as a second current for a second LED). The first intensity level and the second intensity level may be associated with an LED calibration setting stored in the device. The device may determine a difference between a desired color characteristic for the flash calibration setting and a color characteristic of the captured image, and adjust the flash calibration setting based on the determined difference. The device also may adjust other stored flash calibration settings based on the determined difference.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable device (such as smartphones, tablets, laptop computers, digital cameras, web cameras, and so on) that include one or more cameras and a multiple light source flash system (such as multi-LED or multiple xenon flash tube or other types of flash tubes or cubes), and may be implemented in devices having a variety of camera and flash configurations.

While portions of the below description and examples use two LED flash systems for a device in order to describe aspects of the disclosure, the disclosure applies to any flash system with multiple light sources and is not limited to inclusion or use of two LED flashes.

In some implementations, the number of light sources for the flash may be any number of light sources greater than two. For example, a device may blend light from three or four light sources with different color temperatures. To blend the light, the device may control the current to each of the three or four light sources. The below examples and description, while in portions describe a two LED flash, also apply to flash systems with a number of light sources greater than two (such as three, four, and so on).

In some implementations, the flash light sources are xenon flash tubes or other types of light sources with different color temperatures. For example, a device may blend light from a first xenon flash tube and from a second xenon flash tube. The below examples and description, while in portions describe LED flash, also apply to flash systems with other types of light sources (such as flash tubes and cubes).

Figure 1B:
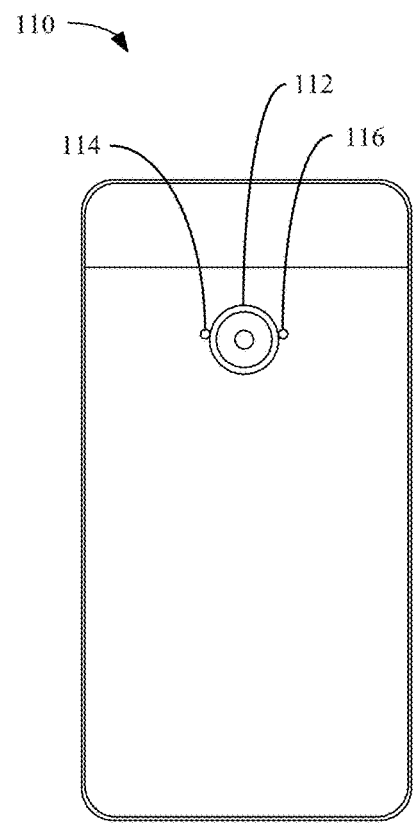
FIG. 1B depicts another example device including a camera and multiple flash light sources.

FIG. 1A depicts an example device 100 including a camera 102, a first flash light source 104 (such as a first LED), and a second flash light source 106 (such as a second LED) arranged in a first configuration in which the flash light sources 104 and 106 are both positioned to the same side of the camera 102. For another example, FIG. 1B depicts another example device 110 including a camera 112, a first flash light source 114, and a second flash light source 116 arranged in a second configuration in which the flash light sources 114 and 116 are positioned on opposite sides of the camera 112. In some aspects, the flash light sources 104 and 106 of the device 100 can be angled in order to provide overlapping output areas. In addition or in the alternative, the device 100 may include reflectors or lenses to blend the output of the flash light sources 104 and 106 into a substantially homogenous output color. Similarly, the flash light sources 114 and 116 of the device 110 can be angled in order to provide overlapping output areas, and the device 110 may include reflectors or lenses to blend the output of the flash light sources 114 and 116 into a substantially homogenous output color. Also, while the flash light sources are depicted as being for rear facing cameras 102 and 112 of the devices 100 and 110, respectively, some or all aspects of the present disclosure may be implemented for flash light sources associated with a forward facing camera (or other camera of the device).

Figure 2:
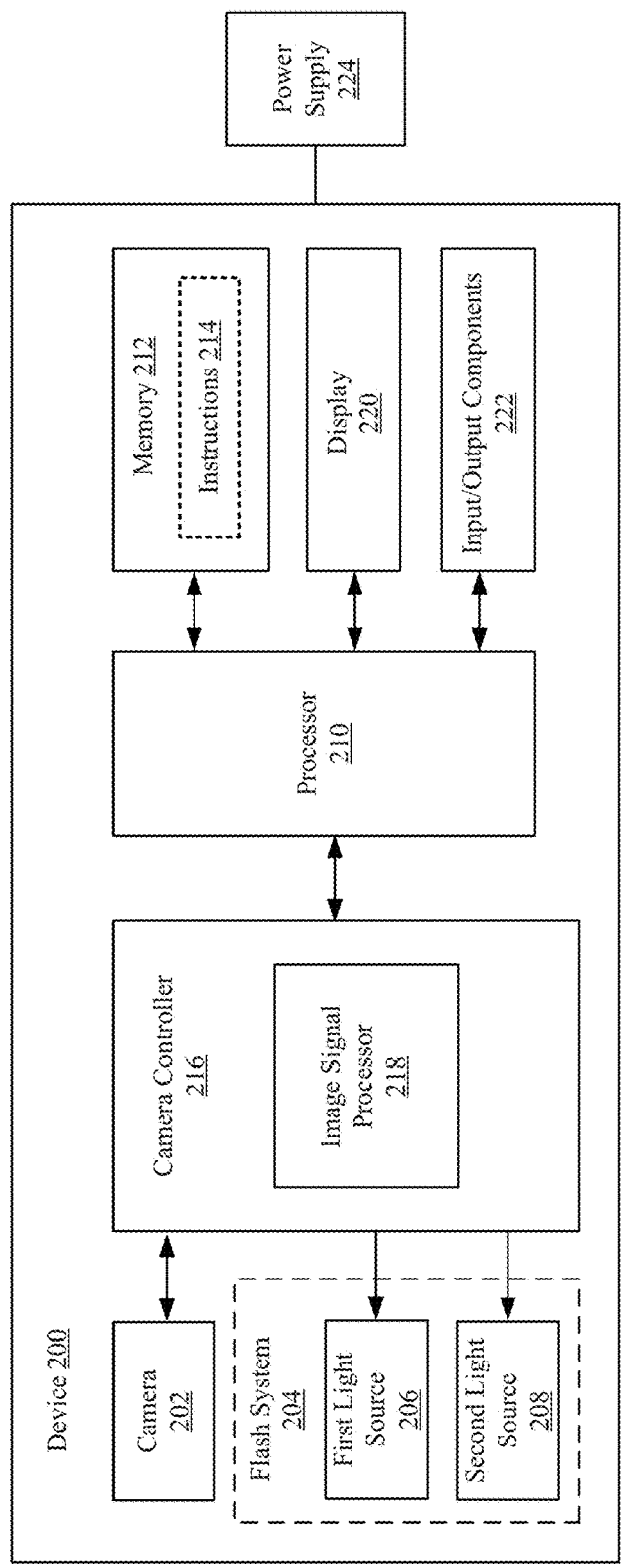
FIG. 2 is a block diagram of an example device including a camera and multiple flash light sources of a flash system.

FIG. 2 is a block diagram of an example device 200. The device 200 may be any suitable device capable of capturing images or video including, for example, wired and wireless communication devices (such as camera phones, smartphones, tablets, security systems, dash cameras, laptop computers, desktop computers, and so on), digital cameras (including still cameras, video cameras, and so on), or any other suitable device. The example device 200 is shown in FIG. 2 to include a camera 202, a flash system 204 that includes a first flash light source 206 and a second flash light source 208, a processor 210, a memory 212 storing instructions 214, a camera controller 216, a display 220, and a number of input/output (I/O) components 222. The device 200 may include additional features or components not shown. For example, a wireless interface, which may include a number of transceivers and a baseband processor, may be included for a wireless communication device. Device 200 may include different types of flash light sources 206 and 208 (such as LEDs, xenon flash tubes, incandescent lighting, other types of flash tubes and cubes, and so on). Additionally or alternatively, device 200 may include more than two flash light sources for a flash system 204. The disclosure should not be limited to any specific examples or illustrations, including example device 200 or flash system 204.

The camera 202 may be one or more cameras and may include the ability to capture individual image frames (such as still images) and/or to capture video (such as a succession of captured image frames). The camera 202 also may include one or more image sensors (not shown for simplicity) for capturing an image frame and providing the captured image frame to the camera controller 216.

The flash system 204 may be part of or separate from the camera 202. The flash system 204 may include a first flash light source 206 having a first color temperature and a second flash light source 208 having a second color temperature different from the first color temperature. In some implementations, the device 200 may use the two flash light sources 206 and 208 concurrently in order to provide a desired overall color temperature for the device's flash when capturing an image (or video). In some aspects, the first flash light source 206 may be a cool color LED (such as having a bluish light), and the second flash light source 208 may be a warm color LED (such as having a yellowish or orangish light). In other aspects, the first and second flash light sources 206 and 208 may be of other suitable color temperatures. Further, although depicted in FIG. 2 as including one camera 202 and two flash light sources 206 and 208, in other implementations, the device 200 may include more than one camera and may include more than two flash light sources.

The memory 212 may be a non-transient or non-transitory computer readable medium storing computer-executable instructions 214 to perform all or a portion of one or more operations described in this disclosure. The device 200 may also include a power supply 224, which may be coupled to or integrated into the device 200.

The processor 210 may be one or more suitable processors capable of executing scripts or instructions of one or more software programs (such as instructions 214) stored within memory 212. In some aspects, the processor 210 may be one or more general purpose processors that execute instructions 214 to cause the device 200 to perform any number of different functions or operations. In additional or alternative aspects, the processor 210 may include integrated circuits or other hardware to perform functions or operations without the use of software. While shown to be coupled to each other via the processor 210 in the example of FIG. 2, the processor 210, memory 212, camera controller 216, the display 220, and I/O components 222 may be coupled to one another in various arrangements. For example, the processor 210, memory 212, camera controller 216, the display 220, and/or I/O components 222 may be coupled to each other via one or more local buses (not shown for simplicity).

The display 220 may be any suitable display or screen allowing for user interaction and/or to present items (such as captured images and video) for viewing by a user. In some aspects, the display 220 may be a touch-sensitive display. The I/O components 222 may be or include any suitable mechanism, interface, or device to receive input (such as commands) from the user and to provide output to the user. For example, the I/O components 222 may include (but are not limited to) a graphical user interface, keyboard, mouse, microphone and speakers, and so on.

The camera controller 216 may include an image signal processor 218, which may be one or more image signal processors to process captured image frames or video provided by the camera 202. In some example implementations, the camera controller 216 (such as image signal processor 218) may control the flash system 204 in order to control the color provided by the flash system 204 when using flash for capturing an image or video. In some aspects, the image signal processor 218 may execute instructions from a memory (such as instructions 214 from memory 212 or instructions stored in a separate memory coupled to the image signal processor 218) to control operation of the flash system 204. In other aspects, the image signal processor 218 may include specific hardware to control operation of the flash system 204. The image signal processor 218 may alternatively or additionally include a combination of specific hardware and the ability to execute software instructions.

Figure 3:
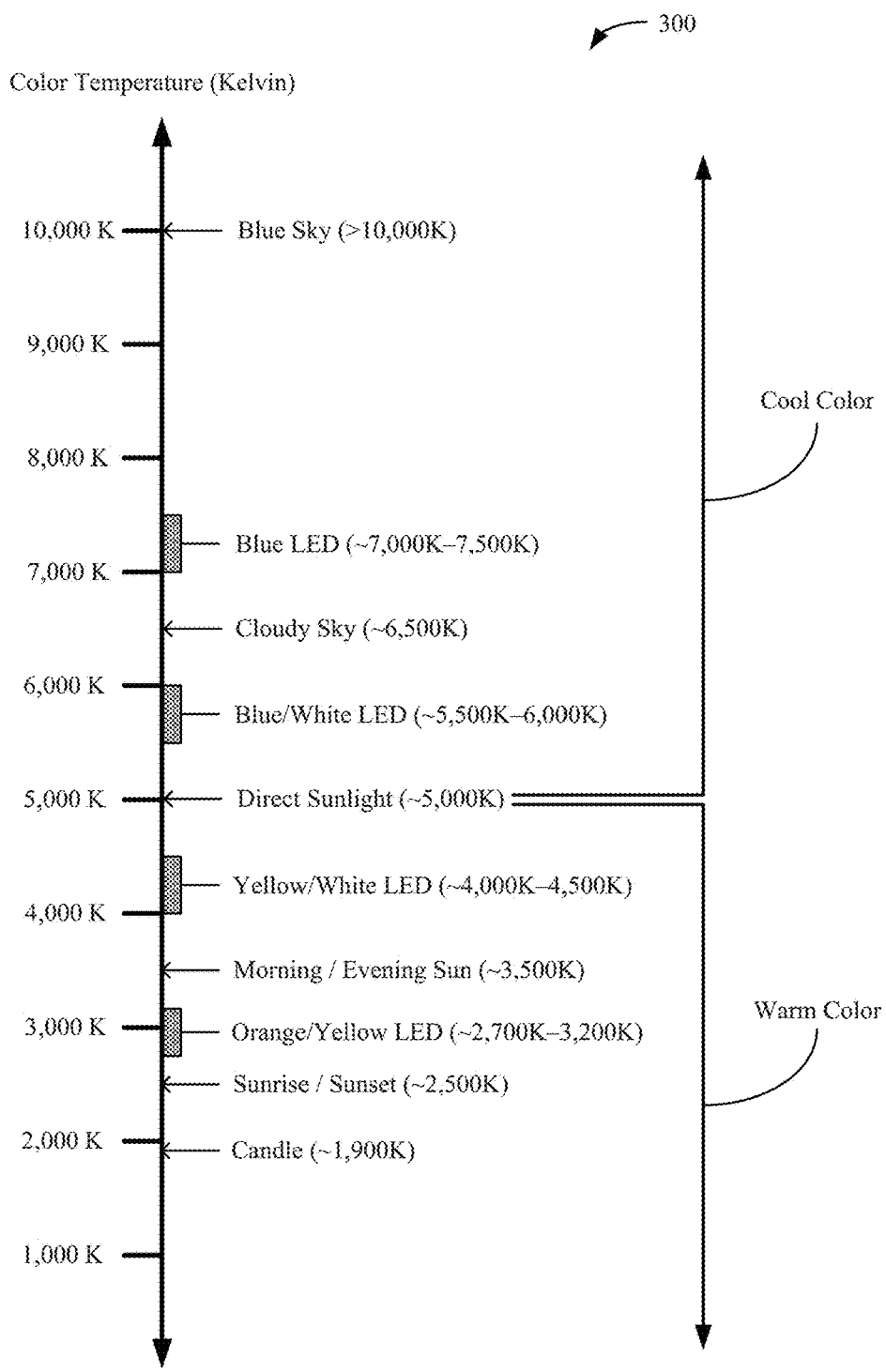
FIG. 3 is an illustration depicting an example color temperature scale for ambient light circumstances and example LED colors.

FIGS. 3-7 include example illustrations regarding a flash system with two LEDs for flash light sources for illustrative purposes. The example illustrations may also apply to different types of flash light sources (such as xenon flash tubes) and any number of flash light sources (such as more than two), and the disclosure should not be limited to the example illustrations. FIG. 3 is an illustration depicting an example color temperature scale 300 for different ambient lights and example LED colors. Different ambient lights may include candlelight at approximately 1,900 degrees Kelvin, sunrise and sunset at approximately 2,500 degrees Kelvin, morning sun (after sunrise) and evening sun (before sunset) at approximately 3,500 degrees Kelvin, direct sunlight (such as a sunny midday) at approximately 5,000 degrees Kelvin, light in a cloudy sky at approximately 6,500 degrees Kelvin, and light in a clear blue sky, which may be greater than 10,000 degrees Kelvin. Direct sunlight (approximately 5,000 degrees Kelvin) is associated with a white light. As the color temperature increases, the light becomes more blue (and is considered a cool color temperature). As the color temperature decreases, the light becomes more yellow and then more red (and is considered a warm color temperature).

As shown in the color temperature scale 300, a type of LED may be within a range of color temperatures. For example, one type of orangish/yellowish LED may have a color temperature between approximately 2,700 to 3,200 degrees Kelvin, one type of yellowish white LED may have a color temperature between approximately 4,000 to 4,500 degrees Kelvin, one type of bluish white LED may have a color temperature between approximately 5,500 to 6,000 degrees Kelvin, and one type of bluish LED may have a color temperature between approximately 7,000 to 7,500 degrees Kelvin. The provided LED temperature colors in the color temperature scale 300 are only examples, and LEDs may have ranges or color temperatures different than the provided examples.

In some implementations, the flash light sources 206 and 208 of the device 200 may be associated with different color temperatures, and based on the specific color temperature of each of the flash light sources 206 and 208, the example device 200 can blend the light provided by the two flash light sources 206 and 208 to create a color temperature that is between the respective color temperatures of the two flash light sources 206 and 208 (such as to mimic different ambient lights or to remove color effects caused by one of the flash light sources or the ambient light). For example, if the first flash light source 206 has a cool color temperature of approximately 6500 degrees Kelvin and the second flash light source 208 has a warm color temperature of approximately 2500 degrees Kelvin, then the device 200 may be able to adjust the first and second flash light sources 206 and 208 in a manner that allows the flash system 204 to produce a light having a color temperature between 2500 and 6500 degrees Kelvin.

To change the overall color temperature of a flash, the brightness or luminance of each of the flash light sources 206 and 208 may be adjusted. For example, if the device 200 is to produce a cool color light, the cool color flash light source 206 may be flashed brighter than the warm color flash light source 208; conversely, if the device 200 is to produce a warm color light, the warm color flash light source 208 may be flashed brighter than the cool color flash light source 206. In some aspects, the brightness or luminance of the flash light sources 206 and 208 may be modified by adjusting the intensity level for each light source 206 and 208. For example, if the light sources 206 and 208 are LEDs, an amount of current supplied to the LEDs 206 and 208 can be adjusted because the LED's brightness may be directly related to the amount of current supplied.

Figure 4:
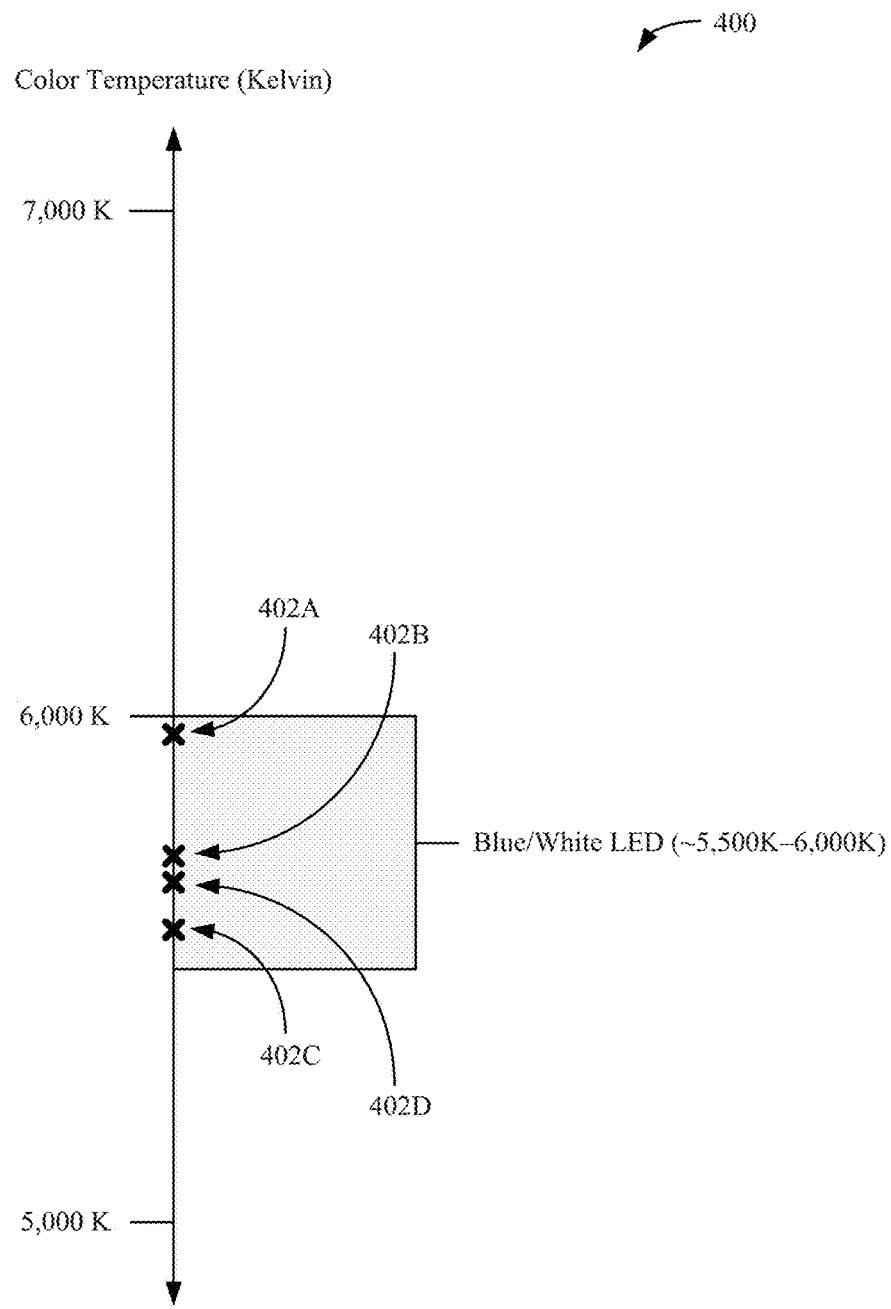
FIG. 4 is an illustration depicting example differences in color temperature between the same type of LEDs.

As shown in FIG. 3, each type of LED has its own range of color temperatures. Thus, LEDs of the same type (including LEDs from the same production batch) may have different color temperatures within a range of color temperatures. FIG. 4 is an illustration 400 depicting example color temperatures 402A-402D of four bluish white LEDs. One LED may have a color temperature closer to 6,000 degrees Kelvin (402A), another LED may have a color temperature closer to 5,600 degrees Kelvin (402C), and other LEDs may have respective color temperatures of approximately 5,800 degrees Kelvin (402B and 402D). Additionally, as a flash light source (such as an LED or flash tube) ages or is used, the color temperature changes over time. As a result, the range of color temperatures after a period of use may be greater than the initial range of color temperatures.

Color balance (or white balance) is a measure of the intensity of colors in an image. Colors diverge from white as their color intensity increases. When a color intensity is low, a color may appear pale or washed out. When the color intensity is high (saturation of the color), the color may appear opaque and be a purer representation of the color. In some example implementations, color balance may be measured as a ratio of red color to green color (red/green ratio or r/g ratio) and as a ratio of blue color to green color (blue/green ratio or b/g ratio). Hence, color balance is a measurement of the intensity of cool colors (such as the b/g ratio) and a measurement of the intensity of warm colors (such as the r/g ratio). Flash light sources with different color temperatures have different color balance measurements (such as different b/g and r/g ratio values from other flash light sources).

Figure 5:
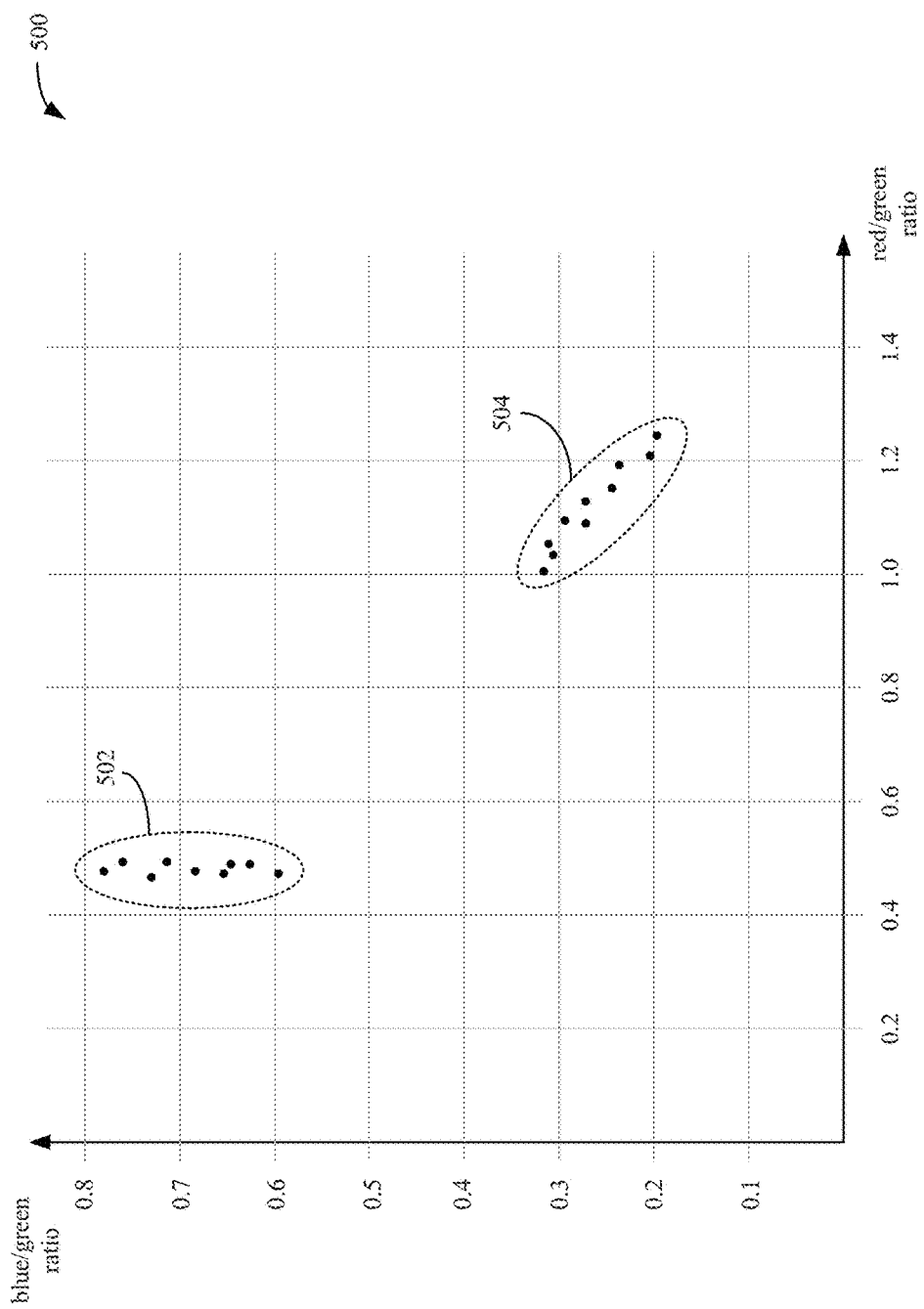
FIG. 5 is an illustration depicting an example color balance dot plot for LEDs with different color temperatures.

FIG. 5 is an illustration depicting an example color balance dot plot 500 for LEDs with different color temperatures. Groups 502 and 504 each represent ten LEDs of the same type (such as a same type of cool color LED for group 502 and a same type of warm color LED for group 504) having different color balance measurements. As shown, both the red/green color ratio and the blue/green color ratio may be different for each of the LEDs in the groups 502 and 504.

Before a camera (such as camera 202) captures an image or video, the device 200 may determine if a flash is to be used for the image capture. For example, the device 200 may determine that the luminance of the ambient light for the scene is below a minimum luminance for the camera. In another example, a user may manually enable a flash for an image capture. If a flash is to be used, the device 200 may determine the color temperature of the flash.

Figure 6:
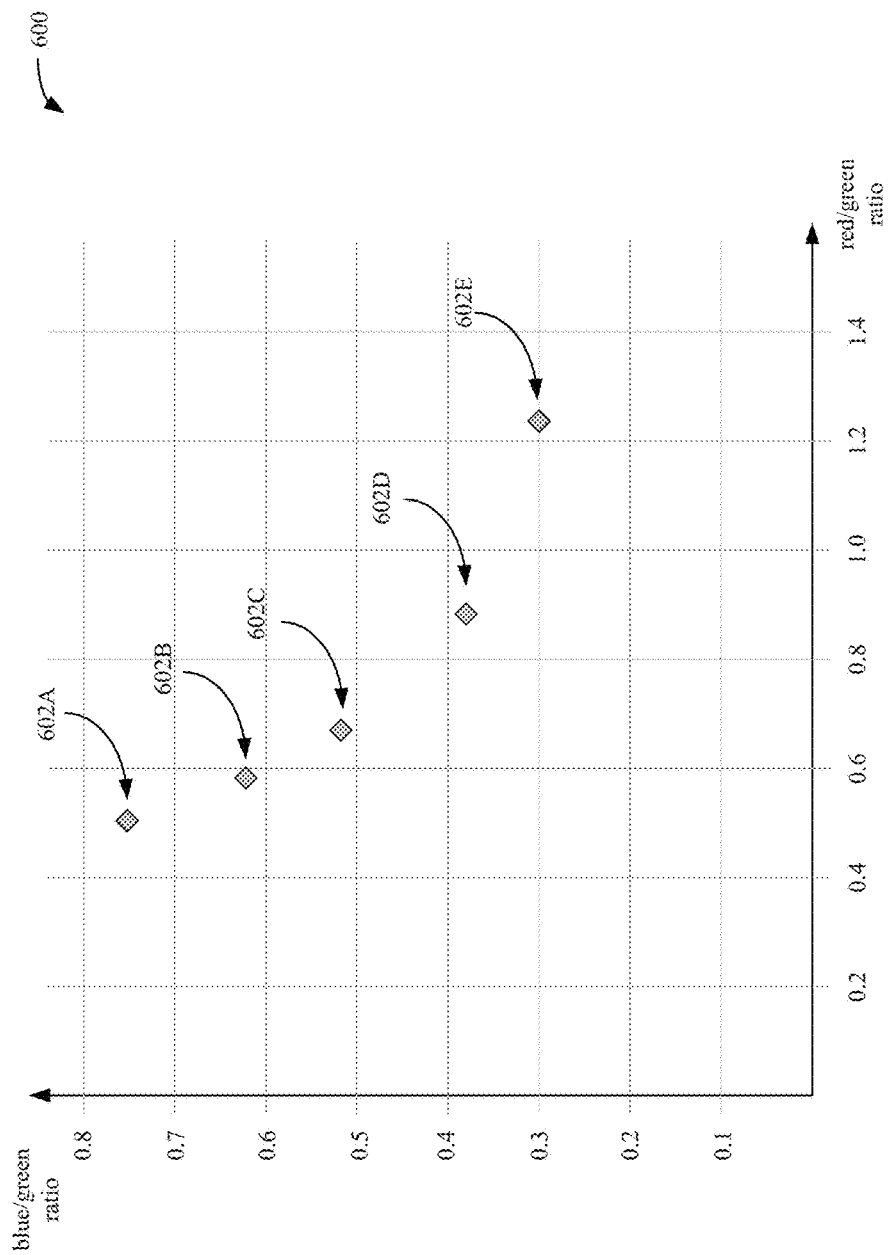
FIG. 6 is an illustration depicting an example graph of a plurality of desired color balances for a flash.

Many devices include a plurality of settings for different flash color temperatures. For example, the device 200 may store a plurality of desired or predetermined color balances for a flash. FIG. 6 is an illustration depicting an example graph 600 of a plurality of desired color balances 602A-602E for a flash. Each of the color balances 602A-602E may have a blue/green color ratio and a red/green color ratio. In some example implementations, each of the color balances 602A-602E is associated with an ambient light situation. For example, referring to both FIG. 3 and FIG. 6, the color balance 602B in FIG. 6 may be associated with an ambient light setting of direct sunlight in FIG. 3 (such as when the blue and red colors are approximately similar intensities in relation to green). Color balance 602A in FIG. 6 may be associated with an ambient light setting of a cloudy sky in FIG. 3 (such as when the blue color has a higher intensity than the red color in relation to the green color). Color balance 602D in FIG. 6 may be associated with an ambient light setting of a morning or evening sun in FIG. 3 (such as when the red color has a higher intensity than the blue color in relation to the green color). Color balance 602E in FIG. 6 may be associated with an ambient light setting of sunrise or sunset in FIG. 3.

Each of the desired color balances 602A-602E may be associated with one of a number of flash calibration settings (such as an LED calibration setting). In some implementations, a user may manually select a flash calibration setting associated with a desired color balance. For example, if the user wants the flash to mimic direct sunlight, the user may select a flash calibration setting associated with color balance 602C for the flash. The user can also select a flash calibration setting associated with a color balance to create a color effect in an image (such as by selecting a flash calibration setting corresponding to color balance 602E to cause an intentional warm color cast in the image). Additionally or alternatively, the device 200 may automatically select a flash calibration setting (corresponding to a color balance). For example, the device 200 may determine a color balance of the scene caused by the current ambient light by capturing the scene or information from the scene without a flash. The device 200 may then use the determined color balance caused by the ambient light to select a flash calibration setting (such as to reduce a color cast that may be caused by the ambient light, to use a flash with a similar color temperature as the ambient light, to mimic the overall light for a scene to be direct sunlight, and so on).

In some aspects, each flash calibration setting (such as the flash calibration settings associated with color balances 602A-602E) is associated with an intensity level for the first flash light source 206 (such as an amount of current for a first LED) and an intensity level for the second flash light source 208 (such as an amount of current for a second LED). The intensity levels (such as amounts of currents) are intended to cause a blended light having the desired color balance, and thus the desired color temperature, indicated by the associated color balance of the flash calibration setting. The stored flash calibration settings may be the same across similar devices. For example, a same model smartphone may include the same flash calibration settings for its camera flash. However, the flash light sources (such as LEDs) between same model smartphones may have different color temperatures (such as through uncontrollable variations during production and/or through extended use of the flash light sources).

To compensate for the color differences, a device manufacturer may test the flash during manufacture in order to calibrate and adjust the flash calibration settings or the intensity levels (such as amounts of current for LEDs or amounts of power) associated with each desired color balance. For example, a smartphone manufacturer may place each smartphone with multiple LEDs on a test bench, flash each LED separately in a controlled setting to determine the color temperature of each LED, and then determine the amount of current that should be applied to each LED for each flash calibration setting. However, testing each device during manufacture to calibrate the flash increases the time and cost of production. Additionally, the settings typically are not updated after the initial determinations during manufacture, even though the color temperatures of the LEDs may change over time and use.

In some implementations, the device 200 may update the flash calibration settings for its flash based on images captured during device use. For example, the device 200 may store a plurality of predefined flash calibration settings associated with desired color balances (such as color balances 602A-602E in FIG. 6). The device 200 may also initially store a factory default setting for an intensity level or amount of power to apply to each of the flash light sources 206 and 208 (for example, an amount of current, such as an amount of amperes, to apply to each of the LEDs) for each flash calibration setting. Alternatively, the manufacturer may perform testing to estimate intensity levels for the flash light sources 206 and 208 (such as amounts of current for LEDs) for different color balances. As a result, the device 200 may periodically update or adjust the flash calibration settings, the corresponding desired color balances, and/or the intensity levels (such as LED currents) associated with each color balance to compensate for variations in color temperatures.

In some aspects, the device 200 may capture an image using a flash calibration setting, and may determine a difference in color balance for the image and the desired color balance for the flash calibration setting. For LEDs, the device 200 may use the difference to determine and update the amount of current to be applied for each of the LEDs 206 and 208 for the flash calibration setting. In other aspects, the device 200 may update or adjust the desired color balance for the currents applied to the flash light sources 206 and 208. In some other aspects, the device 200 may update more than one flash calibration setting based on a determined difference (such as a uniform adjustment in current for an LED for all or a portion of the color balances). In this manner, the device 200 may use the updated flash calibration settings (or updated color balances) the next time the device 200 is to capture an image.

In addition to different color balances for a flash, the device 200 may have or store different brightness settings for a flash. For one example, the device 200 may determine that no or little ambient light exists for a scene, and may set the flash to a maximum brightness. For another example, the device 200 may be limited to a maximum brightness (such as a maximum combined amperage for a first LED 206 and a second LED 208), and may determine, if the flash includes LEDs, a current for the first LED 206 and a current for the second LED 208 so that the LEDs 206 and 208 together create a blended light with a desired color balance while ensuring that the sum of the currents does not exceed a maximum combined current.

As the ambient light for a scene increases, the device 200 may determine that the flash's brightness may be decreased (such as the currents to the LEDs 206 and 208 may be reduced). For example, based on the luminance of the ambient light in the scene, the device 200 with multiple LEDs may set the sum of the currents for the LEDs to, for example, 80 percent, 60 percent, 40 percent, and so on, of the maximum combined current. Any difference in total combined currents may be used by the device 200 (such as different percentages, intervals, nonuniform intervals, and so on), and aspects of the disclosure are not limited to the above examples. The process may also be used in adjusting intensity levels of flash tubes or cubes or other types of flash light sources (such as adjusting power levels supplied to a flash tube).

Figure 7:
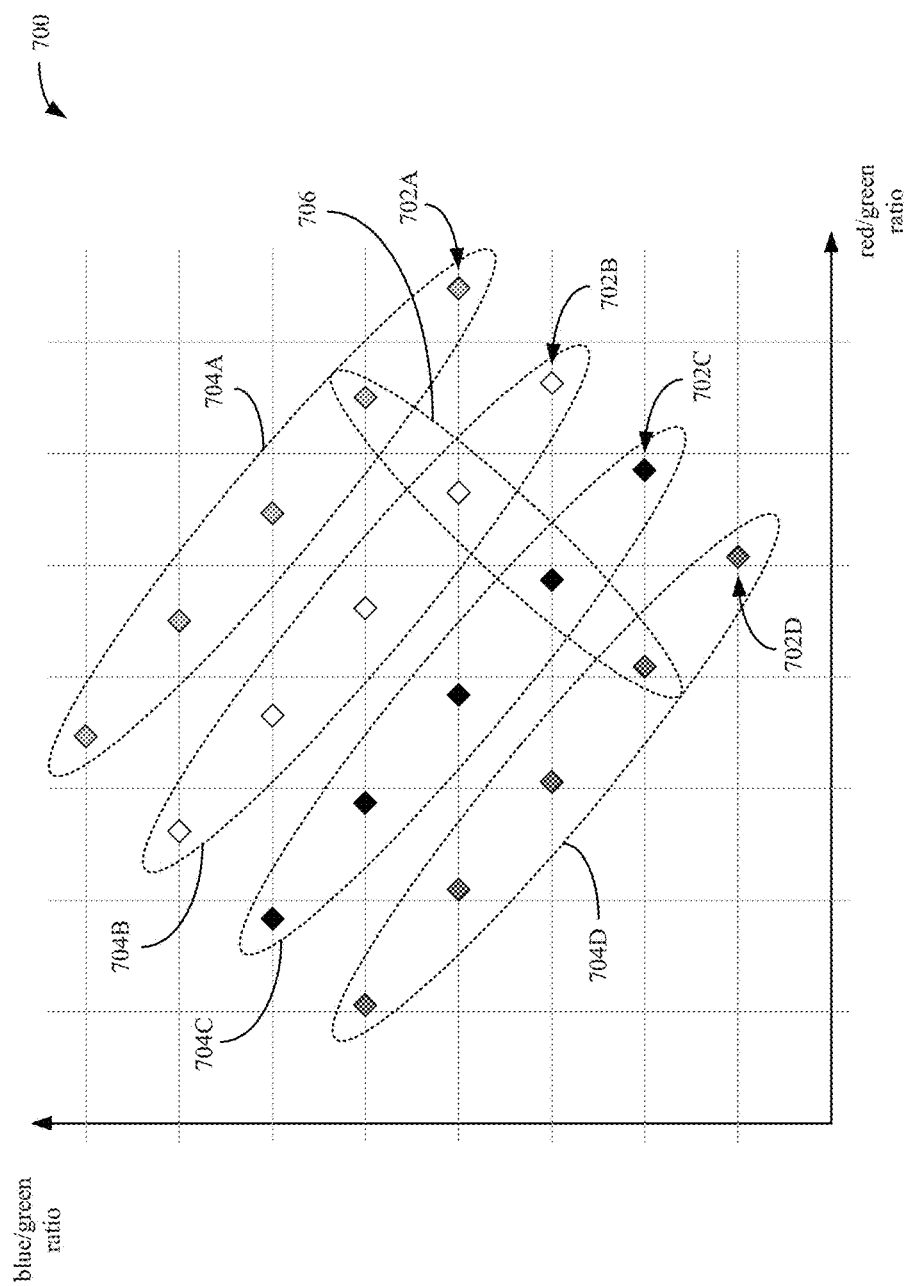
FIG. 7 is an illustration depicting a plurality of example preferred color balances for different total amounts of current to be provided to the LEDs.

For each brightness level for the flash, the device 200 may store a plurality of flash calibration settings (such as flash calibration settings associated with color balances 602A-602E in FIG. 6). FIG. 7 is an illustration 700 depicting a plurality of example preferred color balances 702A-702D associated with different total amounts of current to be provided to the flash light sources 206 and 208. Each group 704A-704D includes different color balances for the same brightness level (such as the same combined current for the multiple LEDs). For example, group 704A may include the color balances associated with a maximum total current for two LEDs, group 704B may include color balances associated with 80 percent of the maximum total current for two LEDs, group 704C may include color balances associated with 60 percent of the maximum total current for two LEDs, and group 704D may include color balances associated with 40 percent of the maximum total current for two LEDs. Group 706 may include settings with similar color balances (such as similar blue and red intensities in relation to green) for different amounts of total current to be supplied to the LEDs.

When adjusting the flash calibration settings, the device 200 may update its persistent storage to include the adjusted values. When adjusting the stored flash calibration settings, the device 200 may adjust one flash calibration setting (such as the flash calibration setting used), may adjust a plurality of flash calibration settings related to the intensity level for the flash light sources (such as an amount of total current supplied to the LEDs, which may be related to flash calibration settings corresponding to groups 704A-704D), may adjust a plurality of flash calibration settings with similar color balances (such as group 706), or may adjust a combination of any or all flash calibration settings. While the below examples for adjusting the stored settings are described regarding one group of color balances (such as the color balances in FIG. 6), the device 200 may adjust or update flash calibration settings related to, for example, different amounts of total current for LEDs 206 and 208 or different levels of brightness for the flash. The examples are for illustrative purposes, and the disclosure should not be limited to the provided examples.

Figure 8:
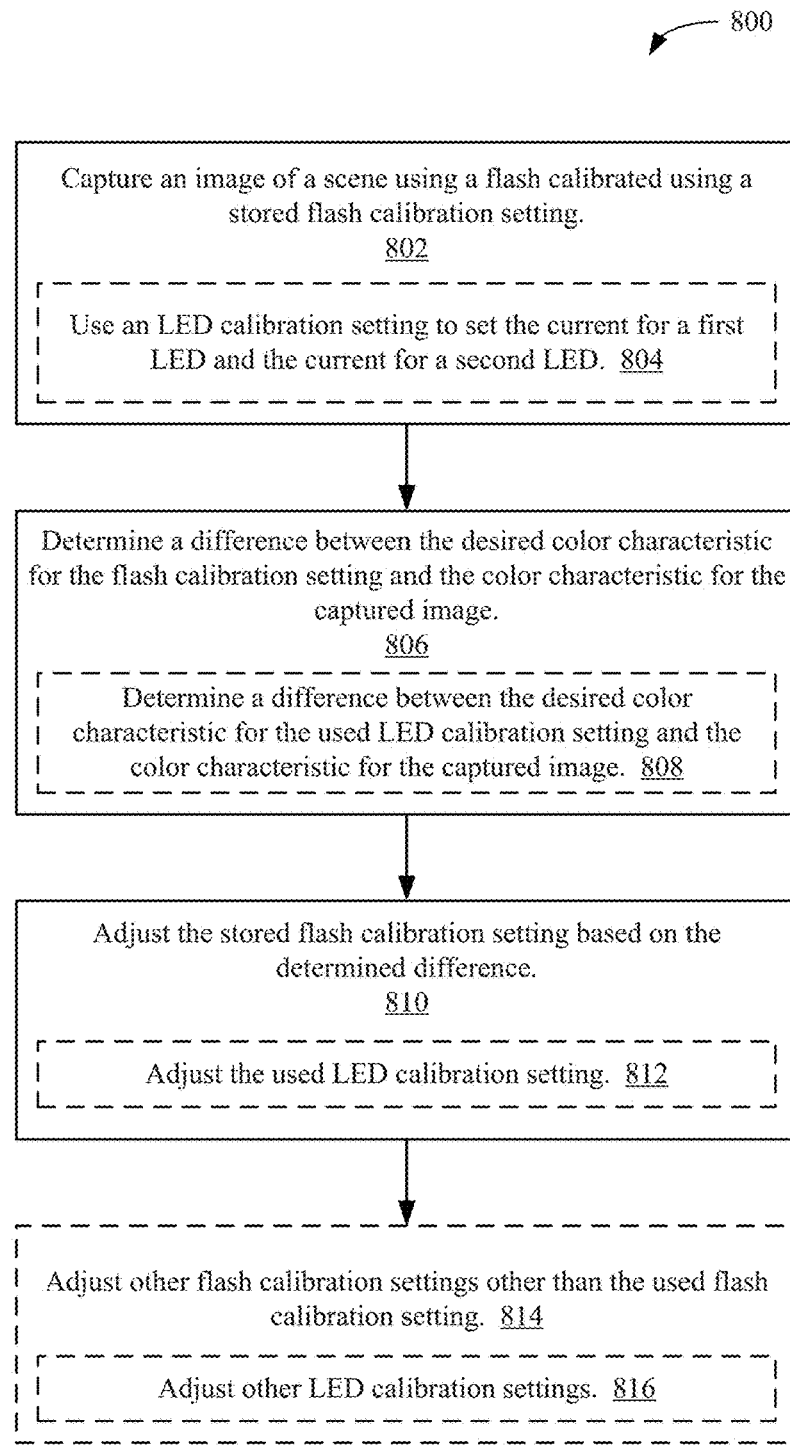
FIG. 8 is an illustrative flow chart depicting an example operation for adjusting one or more flash calibration settings for a flash system.

FIG. 8 is an illustrative flow chart depicting an example operation 800 for adjusting one or more flash calibration settings. Adjusting flash calibration settings may apply to adjusting LED calibration settings for LEDs of a flash. The example operation also applies to adjusting flash color calibration data for different types of flash light sources (such as xenon flash tubes) and any number of flash light sources (such as more than two), and although described below with respect to the flash system 204 of the device 200, the example operation 800 may be performed by any suitable device that includes multiple flash light sources (such as xenon flash tubes or LEDs and a number of flash light sources greater than two). Each flash calibration setting may be associated with a color balance (such as a blue/green color ratio and a red/green color ratio) and may correspond to an intensity level for each flash light source of a flash (such as an amount of current for each LED of a flash).

Beginning at 802, the device 200 may capture an image using the flash system 204, wherein the flash system 204 is calibrated using a stored flash calibration setting. For example, the device 200 may use a flash calibration setting (such as an LED calibration setting associated with a color balance 602A-602E in FIG. 6) to set the current for the first LED 206 and the current for the second LED 208 of the flash system 204 (804). The device 200 may then determine a difference between the desired color characteristic for the flash calibration setting and the color characteristic for the captured image (806). For example, the device 200 may determine a difference between the desired color characteristic for a used LED calibration setting (such as a desired color balance or white balance) and the color characteristic for the captured image (808). The device 200 may then adjust the stored flash calibration setting based on the determined difference (810). For example, the device 200 may adjust the used LED calibration setting so that the color characteristic of an image captured using the adjusted LED calibration setting is similar to the desired color characteristic for the LED calibration setting (812). The device 200 may also optionally adjust one or more of the other flash calibration settings (814). For example, the device 200 may adjust other LED calibration settings (816). When updating or adjusting the flash calibration setting, the device 200 may adjust the color balance that is associated with the calibration settings for the flash light sources 206 and 208, for example, because the intensity level may cause a color temperature that varies between devices based on the individual flash light sources' color temperatures (such as different LED color temperatures). Alternatively, for LEDs, the device 200 may adjust the currents to apply to the LEDs 206 and 208 for an LED calibration setting.

Figure 9:
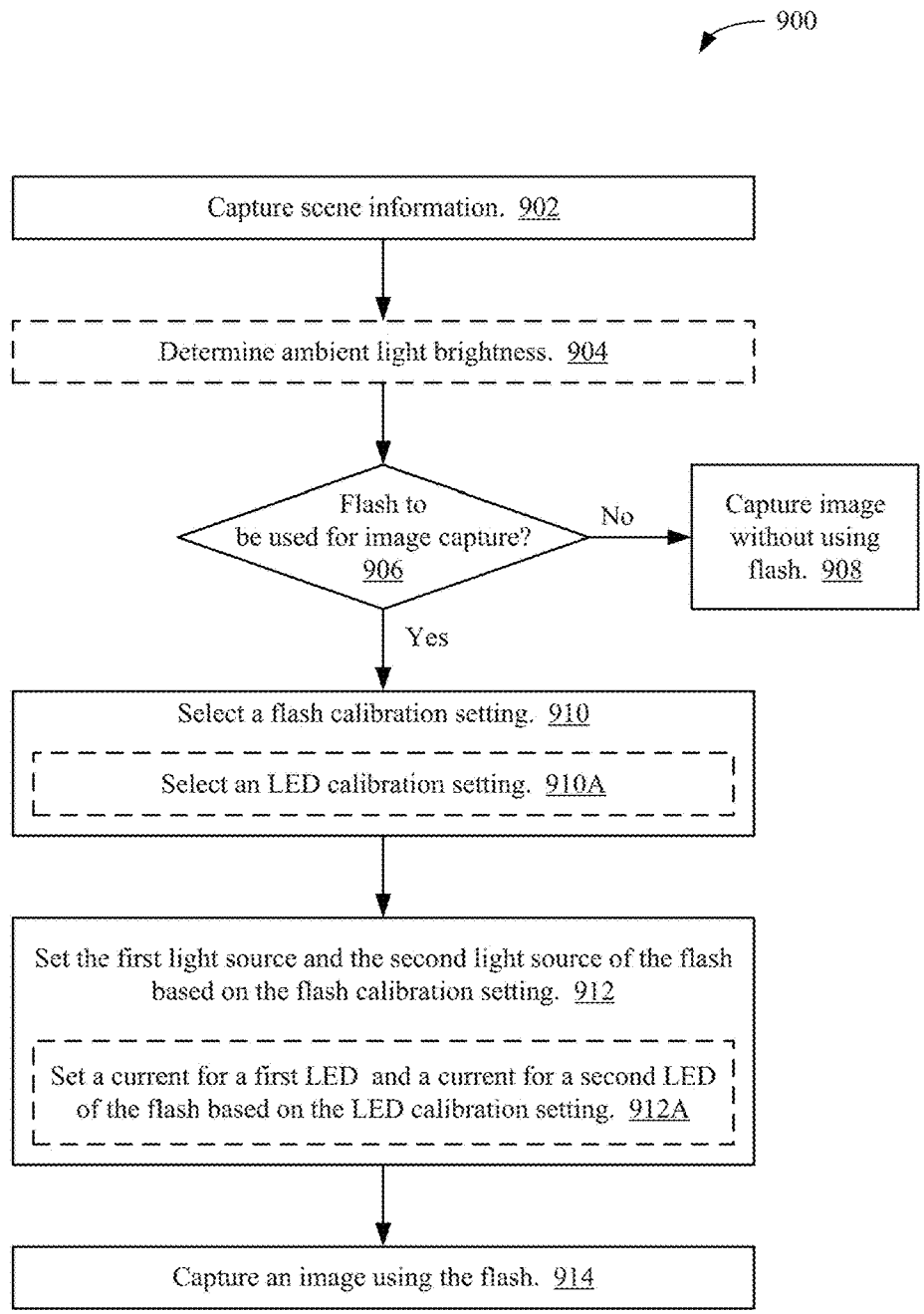
FIG. 9 is an illustrative flow chart depicting an example operation for capturing an image using a flash system.

FIG. 9 is an illustrative flow chart depicting an example operation 900 for capturing an image using a flash. Although described below with respect to the flash system 204 of the device 200, the example operation 900 may be performed by any suitable device that includes multiple flash light sources (such as xenon flash tubes or LEDs and a number of flash light sources greater than two). In some aspects, the operation 900 may be one example implementation of block 802 in the operation 800 depicted in FIG. 8. Beginning at 902, the device 200 may capture scene information using the camera 202. For example, while the camera 202 is initialized, the camera sensor may continually receive information about the scene which may be used to determine different settings for the camera 202 (such as a focal length, a color balance of the scene, an exposure setting, and so on). Examples of capturing scene information include but are not limited to capturing an image without flash, capturing an image with a default flash setting, capturing a portion of an image with or without flash, passively receiving information via the camera sensor when not taking pictures or video, and so on.

In some example implementations, the device 200 may determine from the captured information an ambient light brightness (904). Because the camera 202 may require a minimum brightness to capture an image, the device 200 may determine to use its flash system 204 to capture an image (such as for pictures or video) if the ambient light brightness is less than a threshold. Alternatively or additionally, a user may manually set or otherwise configure the device 200 to use the flash system 204 for capturing an image.

If the flash system 204 is not to be used for image capture (such as the ambient light brightness for the scene is below a threshold, a user has manually set the device to not use the flash, and so on), as tested at 906, the device 200 captures images without using the flash (908). If the flash system 204 is to be used for image capture (906), the device 200 may select flash calibration setting corresponding to a color balance for the flash (910). For example, the device 200 may select an LED calibration setting (910A), such as a calibration setting associated with a direct sunlight color temperature.

The device 200 may then set the first light source 206 at a first intensity level and the second light source 208 at a second intensity level based on the selected flash calibration setting (912). In some aspects, the flash calibration setting is an LED calibration setting that may be associated with a current for the first LED 206 and a current for second LED 208 of the flash system 204. The device 200 may use the selected LED calibration setting to set a current for the first LED 206 and a current for the second LED 208 of the flash 204 (912A). The device 2000 may then capture an image (such as for pictures or video) using the flash with the first flash light source 206 and the second flash light 208 at the applied settings (such as the set currents for LEDs) (914).

If the device's flash calibration settings are not configured (or are partially configured) for the device flash light sources' color temperatures or the flash light sources' color temperatures change over time, then a color characteristic of the captured image may differ from the desired color characteristic associated with the flash calibration setting when capturing the image. In some aspects, the device 200 may determine a difference between the color characteristic of the captured image and the desired color characteristic.

Figure 10:
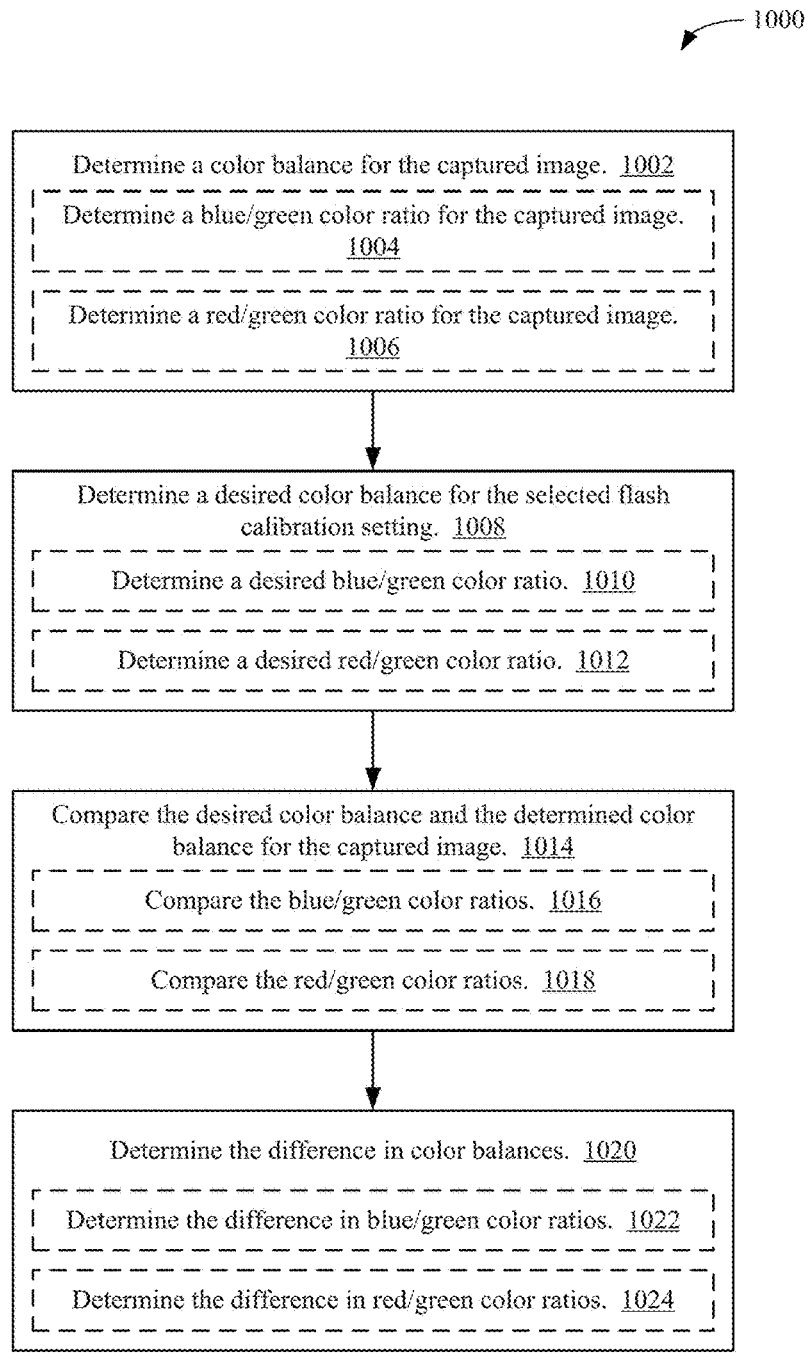
FIG. 10 is an illustrative flow chart depicting an example operation for determining a difference between a color characteristic of the captured image and a desired color characteristic.

FIG. 10 is an illustrative flow chart depicting an example operation 1000 for determining a difference between a color characteristic of the captured image and a desired color characteristic. Although described below with respect to the flash system 204 of the device 200, the example operation 1000 may be performed by any suitable device that includes multiple flash light sources (such as xenon flash tubes or LEDs and a number of flash light sources greater than two). In some aspects, the operation 1000 may be one example implementation of block 806 in the operation 800 depicted in FIG. 8. A color characteristic may be, for example, an intensity of one or more colors, a color saturation, an overall color balance, and so on. The example describes determining a color balance and a difference in color balances. However, the disclosure should not be limited to the provided example.

After capturing an image with the flash system 204 using a flash calibration setting, the device 200 may determine a color balance for the captured image (1002). For example, the device 200 may determine a blue/green color ratio for the captured image (1004). The device 200 may additionally or alternatively determine a red/green color ratio for the captured image (1006). The device 200 may also determine a desired color balance for the flash calibration setting used for the flash in capturing the image (1008). For example, the device 200 may determine a desired blue/green color ratio (1010), and the device 200 may additionally or alternatively determine a desired red/green color ratio (1012).

In some aspects, the device 200 may determine a portion of the image that is white, off-white (such as gray), or another neutral color (not biased to red or blue). The device 200 may then determine a color balance for the portion of the image. In other aspects, the device 200 may determine a color balance for the entire image. For example, the device 200 may average all of the colors (or take a median color) for the pixels of the image and determine the color balance. In some other aspects, the device 200 may determine a blue/green color ratio for a non-blue portion of the image and may determine a red/green color ratio for a non-red portion of the image.

In some example implementations, if the image does not have a sufficient size portion of the image with a neutral color (such as the image is "too colorful" to determine a color balance, wherein the size of the portion of the image with a neutral color is less than a threshold), the device 200 may determine not to use the image to adjust the LED calibration settings. Additionally or alternatively, the size of the adjustment may be based on the size of the neutral color portion of the image. The adjustment may also be based on a variance of the color in the image (such as the more colorful, the smaller the adjustment).

With the desired color balance and the determined color balance for the captured image, the device 200 may compare the two color balances (1014). For example, the device 200 may compare the blue/green color ratios (1016) and the red/green color ratios (1018). Based on the comparison, the device 200 may determine the difference in color balances (1020). For example, the device 200 may determine the difference between the blue/green color ratio for the captured image and the desired blue/green color ratio (1022). The device 200 may also determine the difference between the red/green color ratio for the captured image and the desired red/green color ratio (1024).

Figure 11:
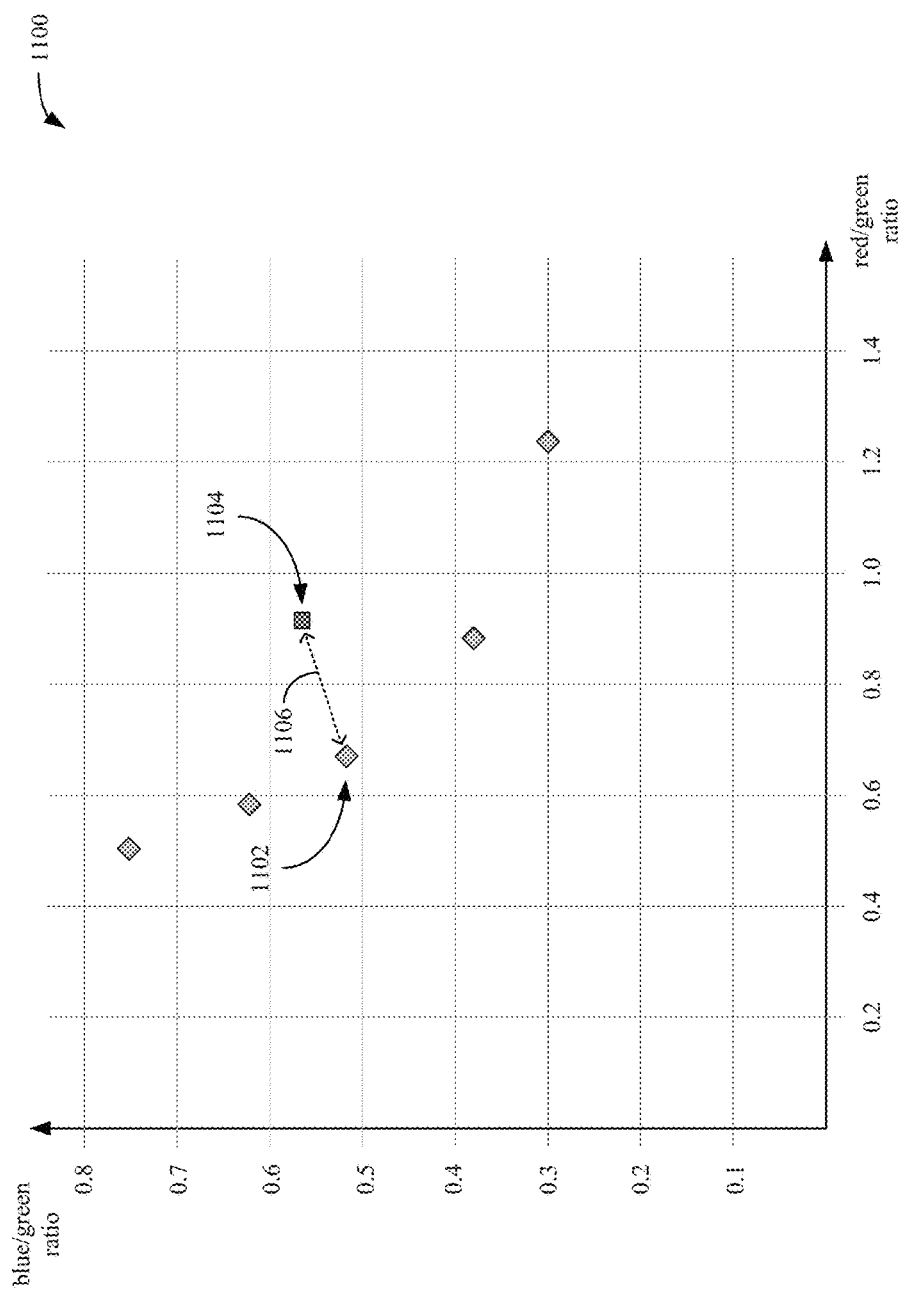
FIG. 11 is an illustration depicting an example desired color balance associated with a flash calibration setting and an example color balance for an image captured using the flash calibration setting.

FIG. 11 is an illustration 1100 depicting an example desired color balance 1102 associated with a flash calibration setting and an example color balance 1104 for an image captured using the flash calibration setting. For illustrative purposes, the color balances shown in FIG. 11 are the same as those depicted in FIG. 6. As illustrated in the example of FIG. 11, the device 200 may have captured an image using the flash calibration setting associated with color balance 1102 in order to, for example where the flash light sources are LEDs, set a current for the first LED 206 and a current for the second LED 208 of the flash system 204. Color balance 1104 represents the determined color balance for the captured image. Color balance 1102 is shown to have a blue/green color ratio of approximately 0.52 and a red/green color ratio of approximately 0.675. Color balance 1104 for the captured image is shown to have a blue/green color ratio of approximately 0.66 and a red/green color ratio of approximately 0.915. The device 200 may determine a color balance difference 1106 to be a blue/green color ratio difference of 0.14 and a red/green color ratio difference of 0.24.

Once the device 200 determines the color characteristic difference (such as a difference in color balance), the device 200 may update the flash calibration setting (such as the flash calibration setting associated with color balance 1102). For example, for LEDs, the device 200 may update the currents to be applied to the LEDs 206 and 208 of the flash in order to adjust the color temperature of the flash. Alternatively, the device 200 may update the color balance associated with the used currents for the LEDs 206 and 208 to be more similar to the color balance for the captured image. In some example implementations, the device 200 may update the flash calibration setting so that the desired color balance 1102 matches the color balance 1104 for the captured image. In some other example implementations, the device 200 may update the flash calibration setting so that the color balance 1102 is, for example, a simple average of color balance 1102 and color balance 1104 or a weighted average of color balance 1102 and color balance 1104. Additionally or alternatively, the device 200 may limit the maximum update or adjustment to the flash calibration setting to a threshold. The device 200 may also average the color balances for a plurality of captured images.

In another example implementation, the device 200 may determine and store a new flash calibration setting for the color balance of the captured image (such as color balance 1104). For example, if the determined difference is greater than a threshold (such as the difference is greater than a pre-determined amount), the device 200 may create a new flash calibration setting instead of adjusting the existing flash calibration setting. The original flash calibration setting may thus be associated with, for the example of multiple LEDs, different currents for the LEDs of the flash that cause a color temperature flash corresponding to that desired color balance.

In addition to updating the selected and used flash calibration setting, the device 200 may update one or more of the other flash calibration settings (such as updating the color balances associated with the flash calibration settings). In some aspects, all of the flash calibration settings may be updated or adjusted for a uniform color balance difference (such as color balance difference 1106). In other aspects, adjusting the flash calibration settings may be based on the difference between the associated color balance and the color balance of the selected flash calibration setting. In this manner, the flash calibration settings with closer color balances may be adjusted more than other flash calibration settings.

Figure 12A:
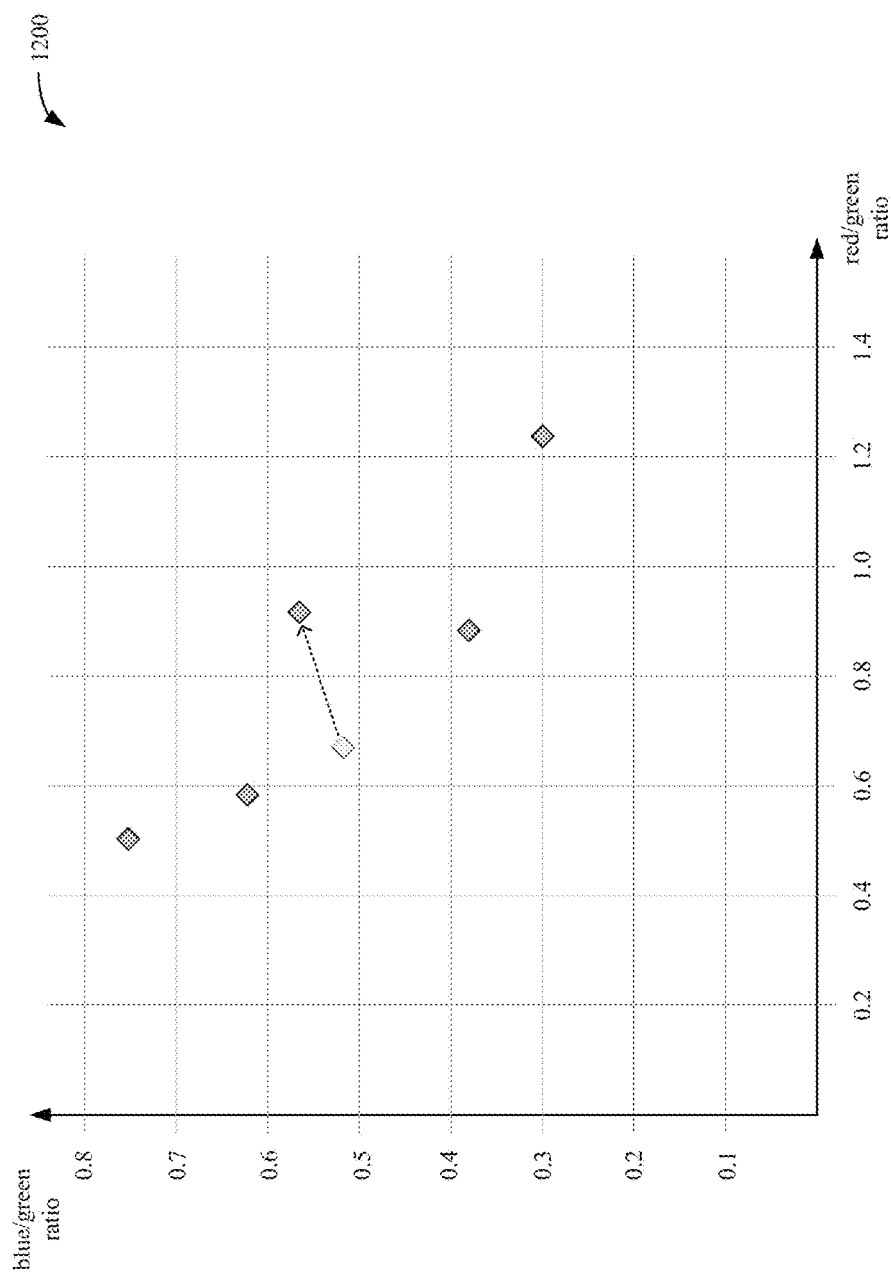
FIG. 12A is an example illustration depicting an adjustment to the color balance of the flash calibration setting.
Figure 12B:
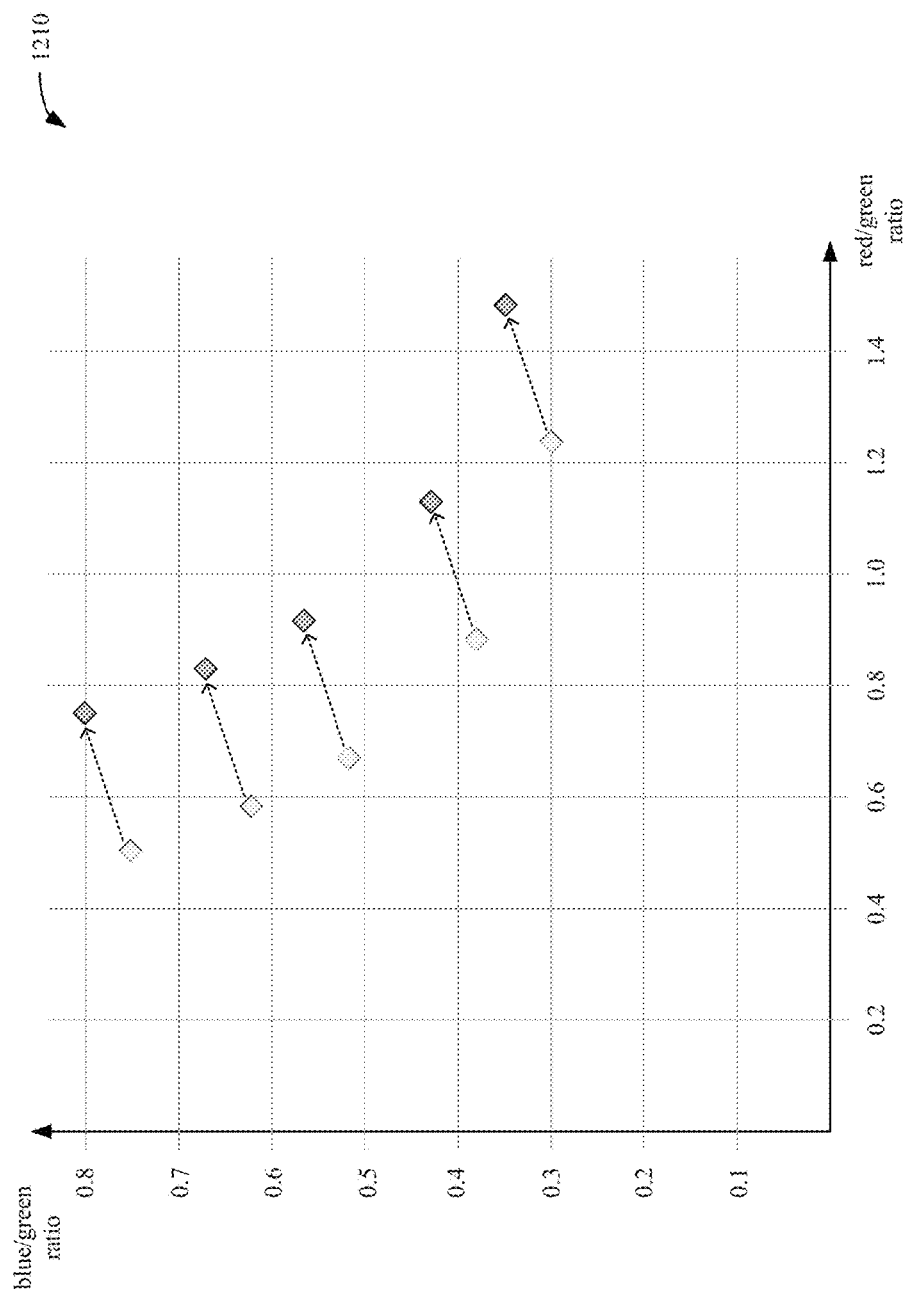
FIG. 12B is an example illustration depicting a uniform adjustment to the color balances for the flash calibration settings.
Figure 12C:
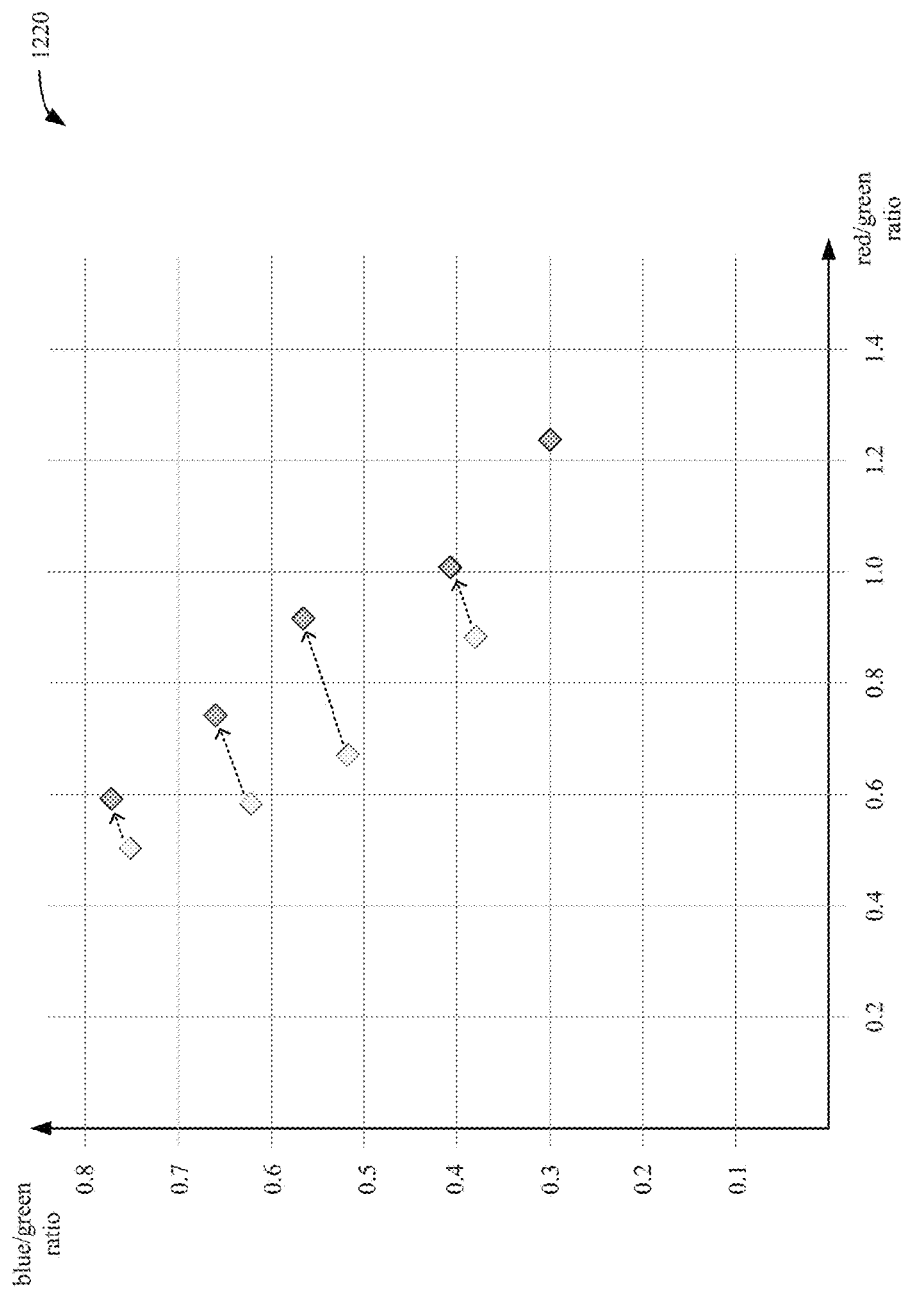
FIG. 12C is an example illustration depicting another adjustment to the color balances for the flash calibration settings.

FIG. 12A is an example illustration 1200 depicting an adjustment to the desired color balance for the used flash calibration setting, FIG. 12B is an example illustration 1210 depicting a uniform adjustment to the color balances of the flash calibration settings, and FIG. 12C is an example illustration 1220 depicting an adjustment to the color balances of the flash calibration settings, wherein the magnitude of the adjustment is related to the similarity of the color balance of the used flash calibration setting and the color balance of the flash calibration setting to be adjusted.

In some aspects for which the flash may be set to different total intensity levels for the flash light sources (such as different total currents for the LEDs) to adjust the brightness of the flash, the device 200 may also adjust the color balances associated with the flash calibration settings for the different total currents. The adjustment may be, for example, uniform, based on a similarity in color balances, and so on. Referring again to FIG. 7, the adjustment may also be for one or more of the groups 704A-704D, for only one of the groups (such as group 706), or any of the group of color balances.

Figure 13A:
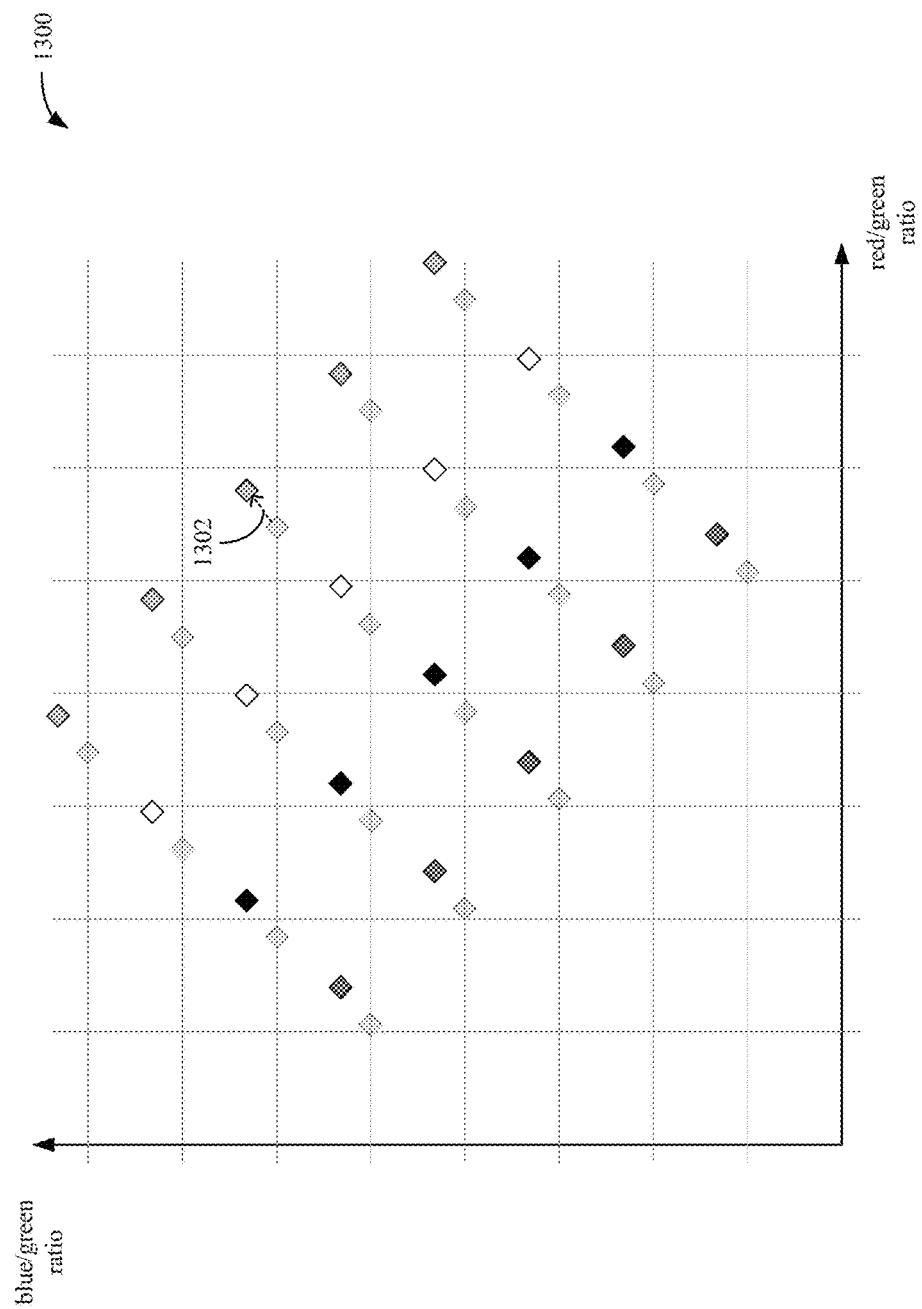
FIG. 13A is an example illustration depicting another uniform adjustment to the color balances for the flash calibration settings.

FIG. 13A is an example illustration 1300 depicting a uniform adjustment to the color balances of the flash calibration settings. The example operation applies to adjusting color balances of flash calibration settings for different types of flash light sources (such as xenon flash tubes or LEDs) and any number of flash light sources (such as two or more). The adjustments are based on the determined difference 1302 from a color balance for a captured image.

Figure 13B:
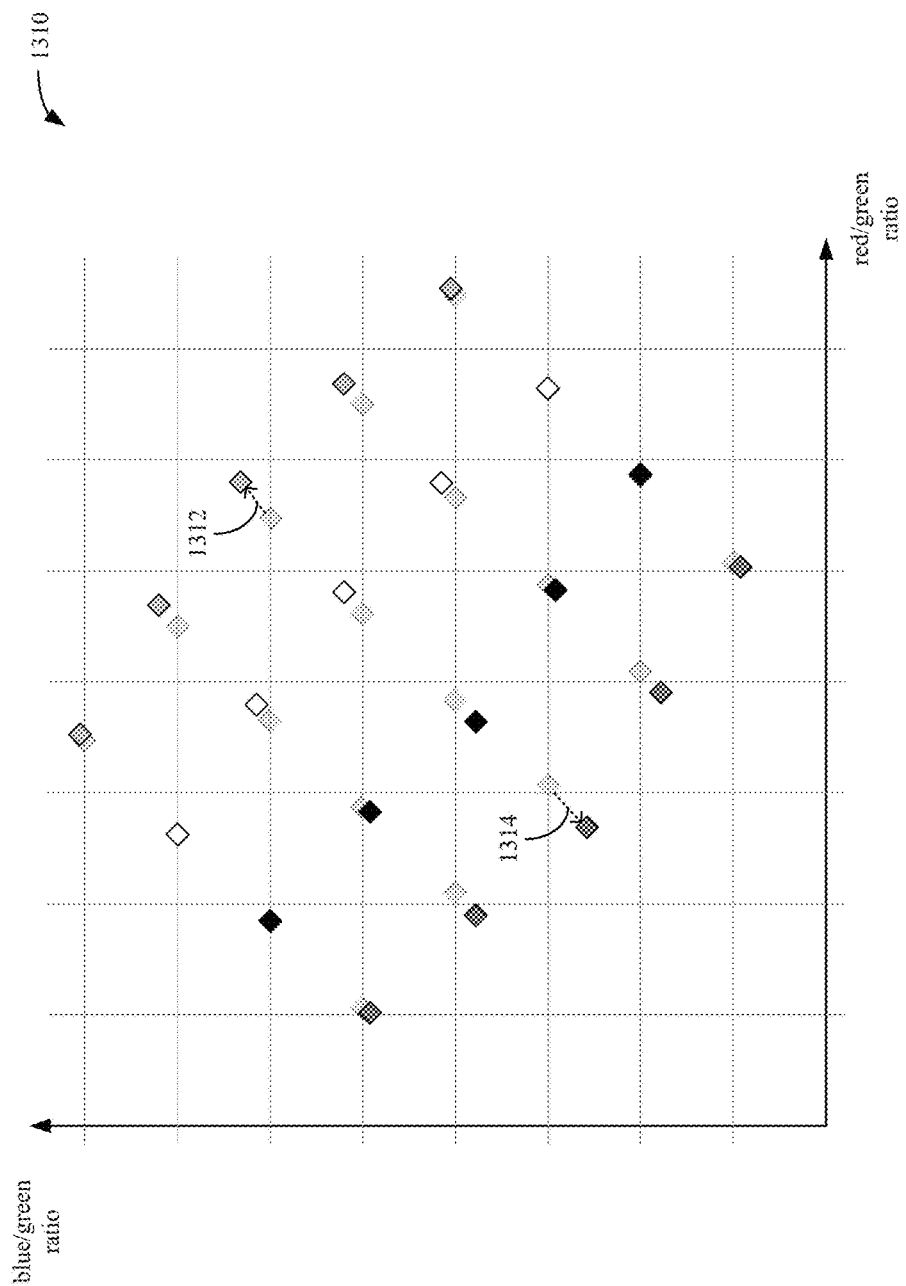
FIG. 13B is an example illustration depicting another adjustment to the color balances for the flash calibration settings for different intensity levels for the flash.

FIG. 13B is an example illustration 1310 depicting an adjustment to the color balances of the flash calibration settings, wherein the magnitude of the adjustment is related to the similarity of the color balance of the used flash calibration setting and the color balance of the flash calibration setting to be adjusted. The example operation applies to adjusting color balances of flash calibration settings for different types of flash light sources (such as xenon flash tubes or LEDs) and any number of flash light sources (such as two or more). The adjustments are based on the determined differences 1312 and 1314 from color balances for two captured images using a flash with different intensity levels (such as total currents for LEDs). The graph of color balances may expand, contract, and/or warp over time as the color balances are periodically adjusted. Additionally or alternatively, the device 200 may limit the overall adjustment or update to the flash calibration settings (the original settings cannot be adjusted more than a maximum amount during the life of the device). If the flash calibration settings are added over time, the set of flash calibration settings may be periodically pruned. For example, any flash calibration setting that may become an outlier over time may be removed from the stored flash calibration settings.

In some aspects, the device 200 may capture an image without a flash, for example, to capture scene information. The device 200 may use the image captured without the flash and the image captured with the flash to determine and adjust one or more of the flash calibration settings. The image captured without the flash may be used by the device, for example, to compare the color balances of the images of the scene captured without and with the flash. The device 200 may also use information from an image captured without the flash to determine whether the image captured with the flash is to be used to update or adjust one or more of the flash calibration settings.

Figure 14:
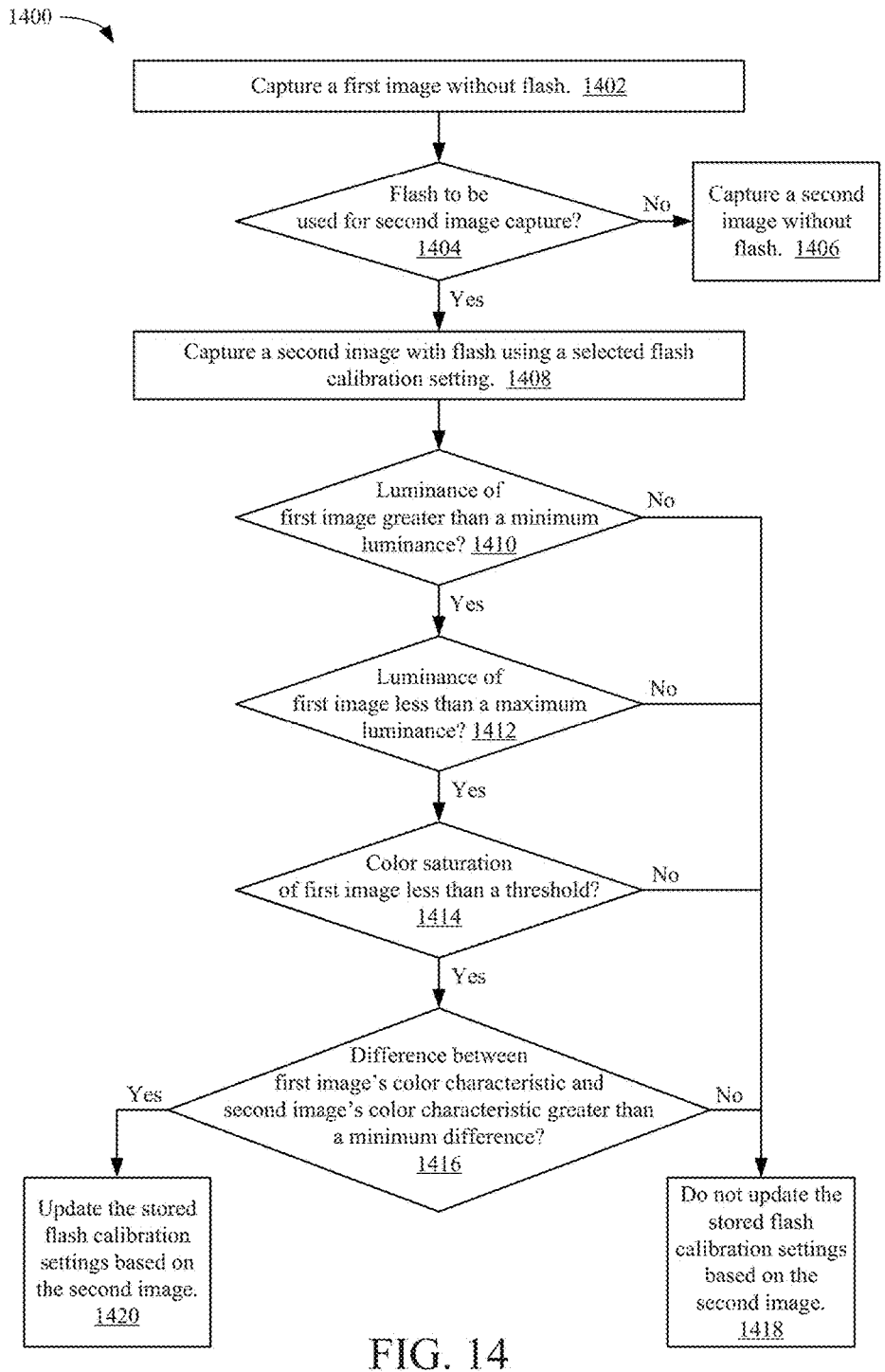
FIG. 14 is an illustrative flow chart depicting an example operation for adjusting one or more flash calibration settings.

FIG. 14 is an illustrative flow chart depicting an example operation 1400 for adjusting one or more flash calibration settings for a flash system using the image captured without the flash and the image captured with the flash. The example operation applies to adjusting flash calibration settings for different types of flash light sources (such as xenon flash tubes or LEDs) and any number of flash light sources (such as two or more). Beginning at 1402, the device 200 captures a first image without the flash. The device 200 may then determine if the flash is to be used to capture a second image. If the flash is not to be used to capture a second image (1404), the device 200 captures the second image without the flash (1406).

If the flash is to be used to capture the second image (1404), the device 200 captures the second image with the flash using a selected flash calibration setting (1408). For example, if the flash 204 includes LEDs 206 and 208, the device 200 selects a flash calibration setting in order to set the currents for the LEDs 206 and 208. If the flash 204 includes flash tubes, the device selects a flash calibration setting in order to set the intensity level for each flash tube. The device 200 may select the flash calibration setting based on information from the first image (such as a color balance of the first image and/or a luminance of the first image).

The device 200 may use the first image (and, in some example implementations, the second image) to determine if the second image is to be used in adjusting the flash calibration settings (such as one or more LED calibration settings for flash light sources that are LEDs). In some example implementations, the device 200 may perform operations to determine one or more conditions 1410-1416 depicted in FIG. 14. For example, the device 200 may determine whether the brightness or luminance of the first image is greater than a threshold or minimum brightness or luminance (1410). If the luminance of the first image is too low (such as below a minimum luminance), then the scene may be too dark or of insufficient ambient light to allow the device 200 to accurately determine colors and other features of the first image. An error may exist for a determined difference between a color balance of the first image and a color balance of the second image if the first image does not have sufficient ambient light for determining the colors in the first image. To prevent errors in a determined difference in color balance between the first image and the second image that may impact the flash calibration settings, the device 200 may determine to not update the flash calibration settings using the second image (1418).

Additionally or alternatively, the device 200 may determine whether the brightness or luminance of the first image is less than a threshold or maximum brightness or luminance (1412). If the luminance of the first image is too high (such as above a maximum luminance), the colors of the scene may be washed out or whited out as a result of the intensity of the ambient light. Thus, similar to the scene being too dark, the device 200 might not accurately determine colors and other features of the first image. An error may exist for a determined difference between a color balance of the first image and a color balance of the second image if the device 200 does not accurately determine the colors in the first image. Therefore, if the luminance of the first image is greater than a maximum luminance (1412), the device 200 may determine to not update the flash calibration settings using the second image (1418).

In other aspects, the device 200 may determine whether a color saturation of the first image is less than a threshold (1414). If the first image has a high color saturation and high intensities in color, the colors in the image may cause an error in determining a color characteristic (such as a color balance) of the first image. For example, if there is an insufficient portion of the image that is off-white or another neutral color, or the image is predominantly red (such as a close-up image of a red rose) or blue (such as an image of the sky), the colors may cause an error in determining the color balance of the image. Therefore, if the color saturation of the first image is greater than a threshold (1414), the device 200 may determine to not update or adjust the flash calibration settings using the second image (1418).

Additionally or alternatively, the device 200 may determine whether the difference between the first image's color characteristic and the second image's color characteristic is greater than a minimum difference or threshold (1416). For example, the device 200 may determine whether the difference between a color balance of the first image and a color balance of the second image is greater than a threshold. If the difference in color characteristic (such as color balance) is less than a minimum difference, the flash may not have a noticeable effect on the color characteristic (or the color balance is not affected by a substantial amount). If the difference is sufficiently small (such as less than a threshold) (1416), the device 200 may determine to not adjust the flash calibration settings using the second image (1418). In this manner, the device 200 may preserve processing resources and time by not updating the flash calibration settings. For the one or more conditions determined by the device 200 (such as conditions 1410-1416), if the conditions determined by the device 200 are valid (a "yes" decision), the device 200 may adjust or update one or more of the flash calibration settings based on the second image (1420).

The device 200 may perform other comparisons (not shown) between the first image and the second image or for the statistics of the first image to determine whether to adjust one or more flash calibration settings using the second image. For example, the device 200 may compare the luminances of the two images (such as to determine if greater than a threshold), the device 200 may determine the amount of time elapsed between the images (such as to determine if less than a threshold), the device 200 may compare only one of the color ratios (such as a blue/green color ratio) for the color balance, and so on. The examples provided are for illustrative purposes, and the disclosure should not be limited to the provided examples.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 212 in the example device 200 of FIG. 2) comprising instructions 214 that, when executed by the processor 210 (or the image signal processor 218), cause device 200 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 210 or the image signal processor 218 in the example device 200 of FIG. 2. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. For example, the steps of the example operations illustrated FIGS. 8-10 and 14, if performed by the device, may be performed in any order and at any frequency (such as for every image capture, a periodic interval of image captures, every period of a number of days or other time, and so on). Furthermore, although elements may be described or claimed in the singular, the plural is contemplated unless limitation to the singular is explicitly stated. For example, while one color characteristic (such as color balance) is described as being determined, multiple other color characteristics (such as luminance, color variance, and so on) may be determined or used to adjust the flash calibration settings. The flash calibration settings may also correspond to color characteristics other than a color balance. Accordingly, the disclosure is not limited to the illustrated examples and any means for performing the functionality described herein are included in aspects of the disclosure.

What is claimed is:

1. A device, comprising:
  a camera;
  a first flash light source configured to emit light having a first color temperature;
  a second flash light source configured to emit light having a second color temperature different from the first color temperature;
  a memory including a number of stored flash calibration settings, wherein each flash calibration setting is associated with a different color characteristic; and
  a processor configured to:
    receive, from the camera, a first image of a scene captured with the first flash light source and the second flash light source driven based on a first flash calibration setting of the number of stored flash calibration settings;
    determine a difference between a desired color characteristic for the first flash calibration setting and a color characteristic of the first image; and
    adjust the first flash calibration setting based on the determined difference.

2. The device of claim 1, wherein:
  the first flash light source is a first light emitting diode (LED);
  the second flash light source is a second LED; and
  the number of stored flash calibration settings is a number of stored LED calibration settings.

3. The device of claim 1, wherein the processor is further configured to:
  receive, from the camera, a second image of the scene captured without the first flash light source emitting light and the second flash light source emitting light;
  determine a color characteristic of the second image;
  compare the color characteristic of the first image and the color characteristic of the second image, wherein adjusting the first flash calibration setting is further based on the comparison.

4. The device of claim 3, wherein for adjusting the first flash calibration setting, the processor is configured to:
  prevent adjusting the first flash calibration setting when the device determines at least one from the group consisting of:
    a color saturation of the second image is above a saturation threshold;
    a luminance of the second image is below a first luminance threshold;
    the luminance of the second image is above a second luminance threshold greater than the first luminance threshold; and
    a difference between the color characteristic of the first image and a color characteristic of the second image is below a color threshold.

5. The device of claim 1, wherein for adjusting the first flash calibration setting, the processor is configured to:
  determine a new flash calibration setting based on the color characteristic of the first image; and
  add the new flash calibration setting to the number of stored flash calibration settings.

6. The device of claim 1, wherein the processor is further configured to:
  adjust one or more of the number of stored flash calibration settings different from the first flash calibration setting based on the determined difference.

7. The device of claim 1, wherein the processor is further configured to:
  select one of the number of stored flash calibration settings based on information received from the camera before receiving the first image; and
  determine driving the first flash light source and driving the second flash light source based on the selected flash calibration setting.

8. The device of claim 7, wherein the processor is further configured to:
  receive, from the camera, a second image of the scene captured without light emitting from the first flash light source and without light emitting from the second flash light source; and
  determine a color characteristic of the second image, wherein the information received from the camera comprises the color characteristic of the second image.

9. The device of claim 1, wherein each color characteristic is a color balance.

10. A method, comprising:
  receiving, from a camera, a first image of a scene captured with a first flash light source emitting light having a first color temperature and with a second flash light source emitting light having a second color temperature different from the first color temperature, wherein the first flash light source and the second flash light source are driven based on a first flash calibration setting of a number of stored flash calibration settings;
  determining a difference between a desired color characteristic for the first flash calibration setting and a color characteristic of the first image; and
  adjusting the first flash calibration setting based on the determined difference.

11. The method of claim 10, wherein:
  the first flash light source is a first light emitting diode (LED);
  the second flash light source is a second LED; and
  the number of stored flash calibration settings are a number of stored LED calibration settings.

12. The method of claim 10, further comprising:
  receiving, from the camera, a second image of the scene captured without light emitting from the first flash light source and without light emitting from the second flash light source;
  determining a color characteristic of the second image;
  comparing the color characteristic of the first image and the color characteristic of the second image, wherein adjusting the first flash calibration setting is further based on the comparison.

13. The method of claim 12, wherein adjusting the first flash calibration setting comprises:
  preventing adjustment of the first flash calibration setting when at least one occurs from the group consisting of:
    a color saturation of the second image is above a saturation threshold;

a luminance of the second image is below a first luminance threshold;

the luminance of the second image is above a second luminance threshold greater than the first luminance threshold; and a difference between the color characteristic of the first image and a color characteristic of the second image is below a color threshold.

14. The method of claim 10, wherein adjusting the first flash calibration setting comprises:

determining a new flash calibration setting based on the color characteristic of the first image; and adding the new flash calibration setting to the number of stored flash calibration settings.

15. The method of claim 10, further comprising:

adjusting one or more of the number of stored flash calibration settings different from the first flash calibration setting based on the determined difference.

16. The method of claim 10, further comprising:

selecting one of the number of stored flash calibration settings based on information received from the camera before receiving the first image; and determining driving the first flash light source and driving the second flash light source based on the selected flash calibration setting.

17. The method of claim 16, further comprising:

receiving, from the camera, a second image of the scene captured without light emitting from the first light source and without light emitting from the second light source; and determining a color characteristic of the second image, wherein the information received from the camera comprises the color characteristic of the second image.

18. The method of claim 10, wherein each color characteristic is a color balance.

19. A non-transitory computer-readable storage medium storing one or more programs containing instructions that, when executed by one or more processors of a device, cause the device to perform operations comprising:

receiving, from a camera, a first image of a scene with a first flash light source emitting light having a first color temperature and with a second flash light source emitting light having a second color temperature different from the first color temperature, wherein the first flash light source and the second flash light source are driven based on a first flash calibration setting of a number of stored flash calibration settings;

determining a difference between a desired color characteristic for the first flash calibration setting and a color characteristic of the first image; and adjusting the first flash calibration setting based on the determined difference.

20. The non-transitory computer-readable storage medium of claim 19, wherein:

the first flash light source is a first light emitting diode (LED);

the second flash light source is a second LED; and the number of stored flash calibration settings are a number of stored LED calibration settings.

21. The non-transitory computer-readable storage medium of claim 19, wherein execution of the instructions causes the device to perform operations further comprising:

receiving, from the camera, a second image of the scene captured without light emitting from the first flash light source and without light emitting from the second flash light source;

determining a color characteristic of the second image;

comparing the color characteristic of the first image and the color characteristic of the second image, wherein adjusting the first flash calibration setting is further based on the comparison.

22. The non-transitory computer-readable storage medium of claim 21, wherein execution of the instructions for adjusting the first flash calibration setting causes the device to perform operations comprising:

prevent adjusting the first flash calibration setting when the device determines at least one from the group consisting of:

a color saturation of the second image is above a saturation threshold;

a luminance of the second image is below a first luminance threshold;

the luminance of the second image is above a second luminance threshold greater than the first luminance threshold; and a difference between the color characteristic of the first image and a color characteristic of the second image is below a color threshold.

23. The non-transitory computer-readable storage medium of claim 19, wherein execution of the instructions for adjusting the first flash calibration setting causes the device to perform operations comprising:

determining a new flash calibration setting based on the color characteristic of the first image; and adding the new flash calibration setting to the number of stored flash calibration settings.

24. The non-transitory computer-readable storage medium of claim 19, wherein execution of the instructions causes the device to perform operations further comprising:

adjusting one or more of the number of stored flash calibration settings different from the first flash calibration setting based on the determined difference.

25. The non-transitory computer-readable storage medium of claim 19, wherein execution of the instructions causes the device to perform operations further comprising:

selecting one of the number of stored flash calibration settings based on information received from the camera before receiving the first image; and determining driving the first flash light source and driving the second flash light source based on the selected flash calibration setting.

26. The non-transitory computer-readable storage medium of claim 25, wherein execution of the instructions causes the device to perform operations further comprising:

receiving, from the camera, a second image of the scene captured without light emitting from the first flash light source and without light emitting from the second flash light source; and determining a color characteristic of the second image, wherein the information received from the camera comprises the color characteristic of the second image.

27. The non-transitory computer-readable storage medium of claim 19, wherein each color characteristic is a color balance.

28. A device, comprising:

means for receiving, from a camera, a first image of a scene with a first flash light source emitting light having a first color temperature and with a second flash light source emitting light having a second color temperature different from the first color temperature, wherein the first flash light source and the second flash light source are driven based on a first flash calibration setting of a number of stored flash calibration settings;

means for determining a difference between a desired color characteristic for the first flash calibration setting and a color characteristic of the first image; and means for adjusting the first flash calibration setting based on the determined difference.

29. The device of claim 28, further comprising:

means for receiving, from the camera, a second image of the scene captured without light emitting from the first flash light source and without light emitting from the second flash light source;

means for determining a color characteristic of the second image;

means for comparing the color characteristic of the first image and the color characteristic of the second image, wherein adjusting the first flash calibration setting is further based on the comparison.

30. The device of claim 28, further comprising: means for determining a new flash calibration setting based on the color characteristic of the first image and add the new flash calibration setting to the number of stored flash calibration settings; or means for adjusting one or more of the number of stored flash calibration settings different from the first flash calibration setting based on the determined difference.

* * * * *